US012780388B2

(12) United States Patent
Zhang et al.

(10) Patent No.: US 12,780,388 B2
(45) Date of Patent: Nov. 3, 2026

(54) OMNIDIRECTIONAL SURFACE VEHICLE

(71) Applicant: The Hong Kong University of Science and Technology, Kowloon (HK)

(72) Inventors: Fumin Zhang, Kowloon (HK); Qiuyang Tao, Sai Kung (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 90 days.

(21) Appl. No.: 18/882,845

(22) Filed: Sep. 12, 2024

(65) Prior Publication Data

US 2025/0108902 A1 Apr. 3, 2025

Related U.S. Application Data

(60) Provisional application No. 63/587,149, filed on Oct. 1, 2023.

(51) Int. Cl.
*B63H 21/21* (2006.01)
*A01K 63/00* (2017.01)
(Continued)

(52) U.S. Cl.
CPC ............ *B63H 21/21* (2013.01); *B63B 1/125* (2013.01); *B63B 79/10* (2020.01); *B63B 79/30* (2020.01);
(Continued)

(58) Field of Classification Search
CPC .. B63H 21/21; B63H 2021/216; B63B 1/125; B63B 79/10; B63B 79/30;
(Continued)

(56) References Cited

U.S. PATENT DOCUMENTS

2017/0355431 A1* 12/2017 Jun ...................... B62D 57/032
2023/0073964 A1 3/2023 Hertel et al.

FOREIGN PATENT DOCUMENTS

CN 112172425 A 1/2021
CN 115265657 A 11/2022
(Continued)

OTHER PUBLICATIONS

ES-2311424-A1 text copy (Year: 2009).*
(Continued)

*Primary Examiner* — Lars A Olson
*Assistant Examiner* — Eric Anthony Starck
(74) *Attorney, Agent, or Firm* — Amin, Turocy & Watson, LLP

(57) ABSTRACT

An omnidirectional surface vehicle (OSV) for use in a water-borne environment is described. The OSV can comprise a platform of interconnected buoyant compartments having incorporated position thrusters to navigate the OSV. The thrusters are connected to a series of ducts and ports to enable navigation of the OSV by fluid intake/ejection. An onboard camera system can be configured to capture imagery of a subsurface structure such as a net in an aquaculture facility. AI and ML technologies can be applied to enable detection of a potential anomaly/hole in the net structure. Location of the anomaly can be determined based on any of a current position/location of the OSV, a current field of view of the camera, a position/focal length of a lens in the camera, etc. Control/operation of the OSV can be performed autonomously by an onboard computer/controller. The OSV can be further configured to communicate with a remote device.

20 Claims, 12 Drawing Sheets

(51) Int. Cl.

| | |
|---|---|
| ***B63B 1/12*** | (2006.01) |
| ***B63B 79/10*** | (2020.01) |
| ***B63B 79/30*** | (2020.01) |
| ***G05D 1/689*** | (2024.01) |
| ***G05D 105/80*** | (2024.01) |
| ***G05D 109/30*** | (2024.01) |
| ***G06T 7/00*** | (2017.01) |
| ***G06T 7/60*** | (2017.01) |
| ***G06T 7/73*** | (2017.01) |

(52) U.S. Cl.
CPC .......... *G05D 1/689* (2024.01); *G06T 7/0002* (2013.01); *G06T 7/60* (2013.01); *G06T 7/73* (2017.01); *A01K 63/00* (2013.01); *B63B 2001/126* (2013.01); *B63H 2021/216* (2013.01); *G05D 2105/89* (2024.01); *G05D 2109/34* (2024.01); *G06T 2207/30244* (2013.01); *G06T 2207/30252* (2013.01)

(58) Field of Classification Search
CPC .......... B63B 2001/126; B63B 2211/02; B63B 2035/006; B63B 2035/007; B63B 2035/008; B63B 35/00; G05D 1/689; G05D 2105/89; G05D 2109/34; G05D 2111/52; G05D 1/245; G06T 7/0002; G06T 7/60; G06T 7/73; G06T 2207/30244; G06T 2207/30252; A01K 63/00; B63G 8/16; B63G 2008/004; B63G 2008/005; B63C 11/42; B63C 11/48; B60F 3/0061; B60F 3/003; B60F 3/0007; B60F 3/0015; B60F 5/02; B60F 3/00; G01C 13/00; G01C 11/025
USPC .......................................................... 441/21
See application file for complete search history.

(56) References Cited

FOREIGN PATENT DOCUMENTS

| | | | | |
|---|---|---|---|---|
| ES | 2311424 A1 * | 2/2009 | ............ | B63C 11/42 |
| WO | WO-02084217 A2 * | 10/2002 | .......... | G01S 15/874 |
| WO | 2022062242 A1 | 3/2022 | | |

OTHER PUBLICATIONS

WO-02084217-A2 text copy (Year: 2002).*
A Visual Servoing Scheme for Autonomous Aquaculture Net Pens Inspection Using ROV. Article [online]. Akram et al., May 5, 2022 [retrieved on Aug. 19, 2026]. Retrieved from the Internet: <URL: https://pmcncbi.nlm.nih.gov/articles/PMC9099505/pdf/sensors-22-03525.pdf>. (Year: 2022).*
Tao, et al., "Omnidirectional Surface Vehicle for Fish Cage Inspection," OCEANS 2018 MTS, Oct. 2018, http://dx.doi.org/10.1109/OCEANS.2018.8604674.
Zhang, et al., "A Novel Autonomous Robotics System for Aquaculture Environment Monitoring," Last revised Nov. 8, 2022, https://doi.org/10.48550/arXiv.2211.00917.
Gutierrez, et al., "Autonomous Surface Vehicle for Measuring Water Body Parameters," Robotics and Automotive Mechanics Conference, Sep. 28, 2010-Oct. 1, 2010, https://doi.org/10.1109/CERMA.2010.68.
Bjelland, et al., "Exposed aquaculture in Norway," In OCEANS 2015-MTS/IEEE Washington, Oct. 19-22, 2015, https://doi.org/10.23919/OCEANS.2015.7404486.
Capocci, et al., "Inspection-Class Remotely Operated Vehicles—A Review," Journal of Marine Science and Engineering 5 (1), Mar. 2017, http://dx.doi.org/10.3390/jmse5010013.
Cottee, et al., "Animal Welfare and Organic Aquaculture in Open Systems," Journal of Agricultural and Environmental Ethics 22(5), Oct. 2009, http://dx.doi.org/10.1007/s10806-009-9169-2.
Haval, "Modelling and control of underwater inspection vehicle for aquaculture sites," Masters thesis, Norwegian University of Science and Technology, Jun. 2012, https://ntnuopen.ntnu.no/ntnu-xmlui/handle/11250/238328.
Rundtop, et al., "Experimental evaluation of hydroacoustic instruments for ROV navigation along aquaculture net pens," Aquaculture Engineering, vol. 74, Sep. 2016, https://doi.org/10.1016/j.aquaeng.2016.08.002.
Chalkiadakis, et al., "Designing a Small-sized Autonomous Underwater Vehicle Architecture for Regular Periodic Fish-cage Net Inspection," IEEE International Conference on Imaging Systems and Techniques, Oct. 2017, https://doi.org/10.1109/IST.2017.8261525.
Potyagaylo, et al., "Asynchronous UKF-based localization of an underwater robotic vehicle for aquaculture inspection operations," OCEANS 2015—MTS/IEEE Washington, Oct. 2015, https://doi.org/10.23919/OCEANS.2015.7404552.
Chang, et al., "Real-Time Guidance of Underwater Gliders Assisted by Predictive Ocean Models," Journal of Atmospheric and Oceanic Technology, vol. 32, Mar. 1, 2015, https://doi.org/10.1175/JTECH-D-14-00098.1.
Chang, et al., "Motion tomography: Mapping flow fields using autonomous underwater vehicles," The International Journal of Robotics Research, vol. 36, Issue 3, Published Apr. 3, 2017, https://doi.org/10.1177/0278364917698747.
Hou, et al., "A Combined Path Planning and Path Following Method for Underwater Glider Navigation in a Strong, Dynamic Flow Field," 2018 OCEANS—MTS/IEEE Kobe, May 2018, https://doi.org/10.1109/OCEANSKOBE.2018.8559348.
Schill, et al., "Visible Spectrum Optical Communication and Distance Sensing for Underwater Applications," Proceedings of ACRA 2004, http://www.araa.asn.au/acra/acra2004/papers/schill.pdf.
Partan, et al., "A survey of practical issues in underwater networks," ACM SIGMOBILE Mobile Computing and Communications Review, vol. 11, Issue 4, Oct. 1, 2007, https://doi.org/10.1145/1347364.1347372.
Akyildiz, et al., "Underwater Acoustic Sensor Networks: Research Challenges," Ad Hoc Networks 3(3), May 2005, http://dx.doi.org/10.1016/j.adhoc2005.01.004.
Tao, et al., "Evaluating Acoustic Communication Performance of Micro AUV in Confined Space," 2018 OCEANS—MTS/IEEE Kobe, May 2018, https://doi.org/10.1109/OCEANSKOBE.2018.8559295.
Stojanovic, et al., "Underwater Acoustic Communication Channels: Propagation Models and Statistical Characterization," IEEE Communications Magazine 47(1), Jan. 1, 2009, http://dx.doi.org/10.1109/MCOM.2009.4752682.
Osen, et al., "A low cost USV for aqua farm inspection," IEEE Techno-Ocean 2016, Oct. 2016, http://dx.doi. org/10.1109/Techno-Ocean.2016.7890664.
Wang, et al., "Design, Modeling, and Nonlinear Model Predictive Tracking Control of a Novel Autonomous Surface Vehicle," IEEE International Conference on Robotics and Automation, May 2018, http://dx.doi.org/10.1109/ICRA.2018.8460632.
Ogello et al., "Aquaculture: A promising solution for food insecurity, poverty and malnutrition in Kenya," African Journal of Food, Agriculture, Nutrition and Development, Published Dec 7, 2016, vol. 16, No. 4, https://doi.org/10.18697/ajfand.76.15900.

* cited by examiner

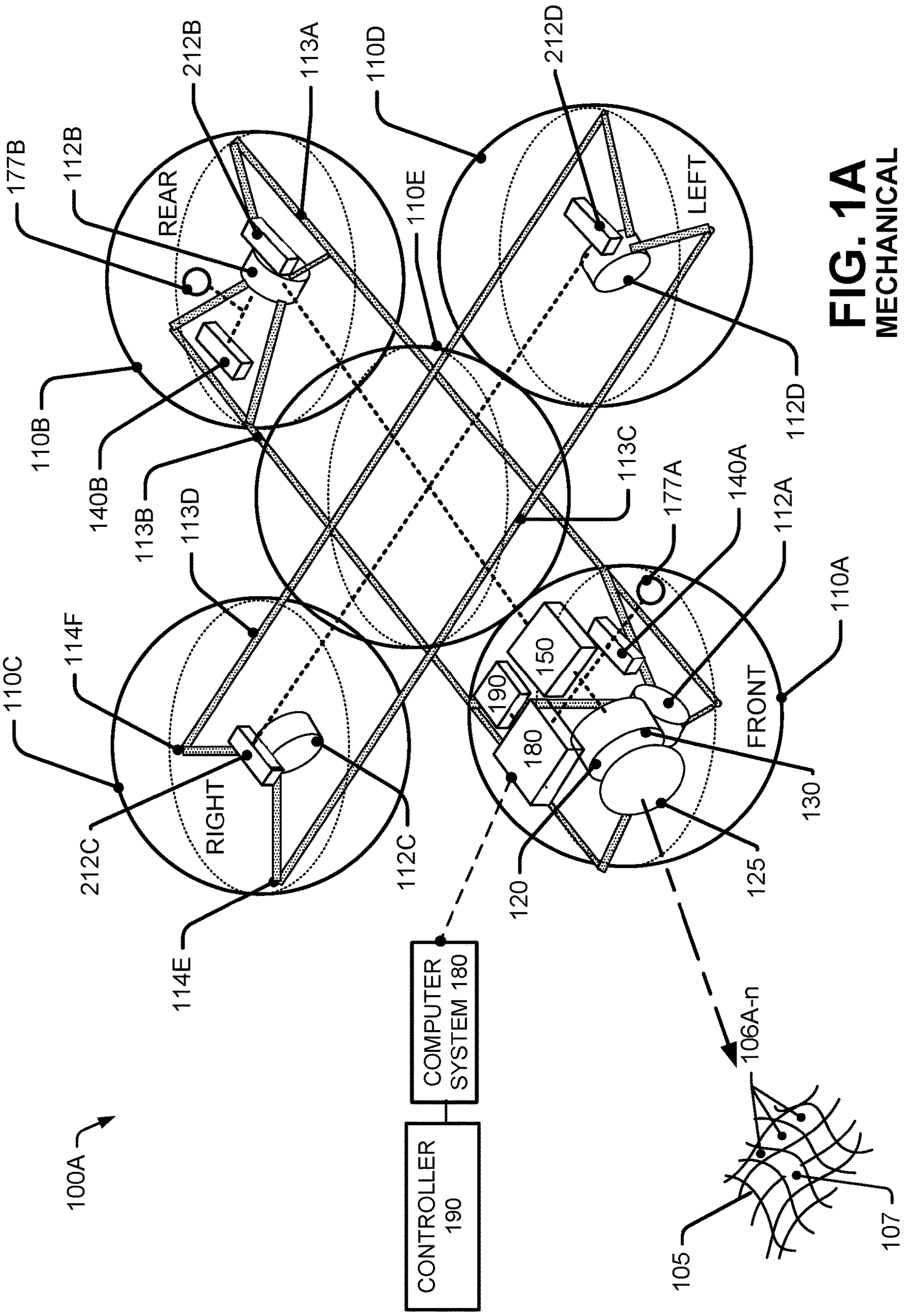
FIG. 1A MECHANICAL ASSEMBLY

MECHANICAL ASSEMBLY

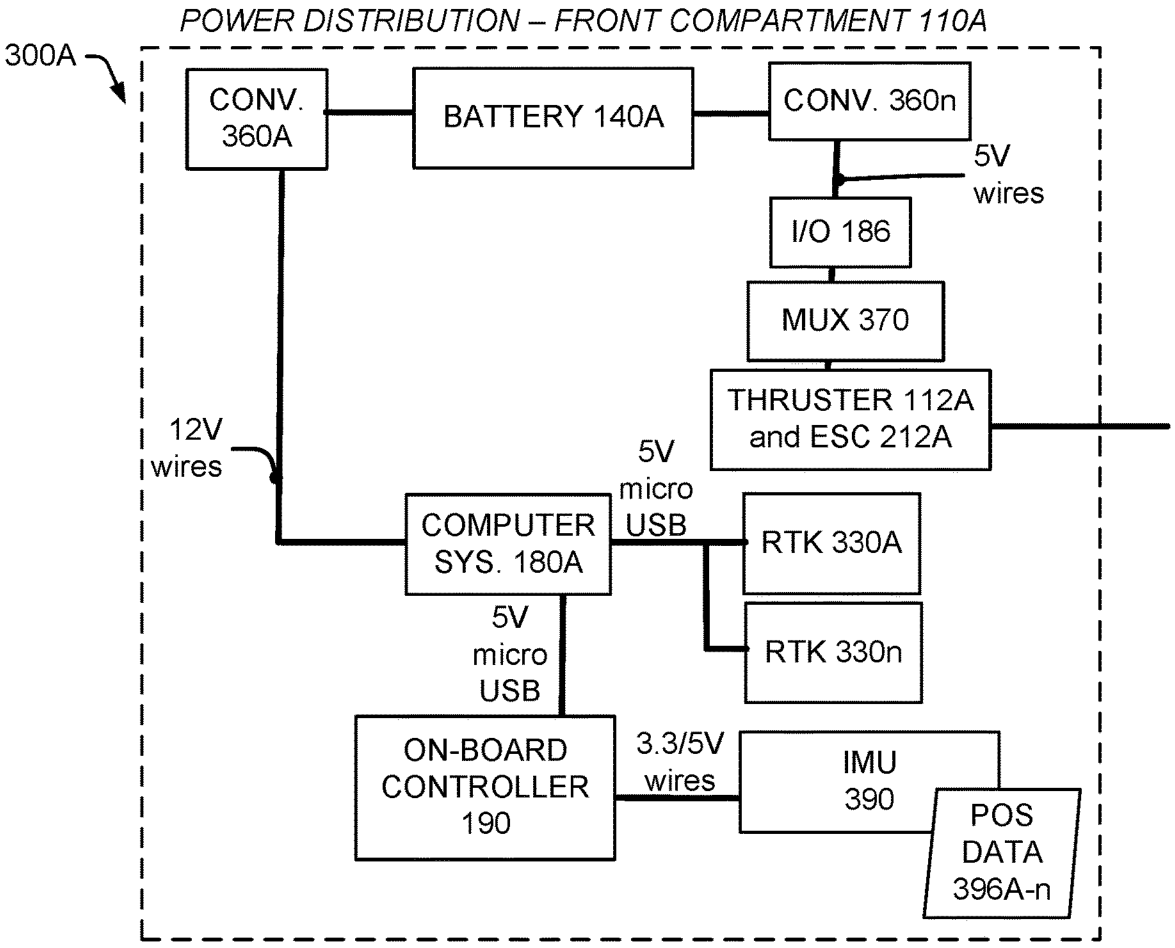
FIG. 3A
FIG. 3B
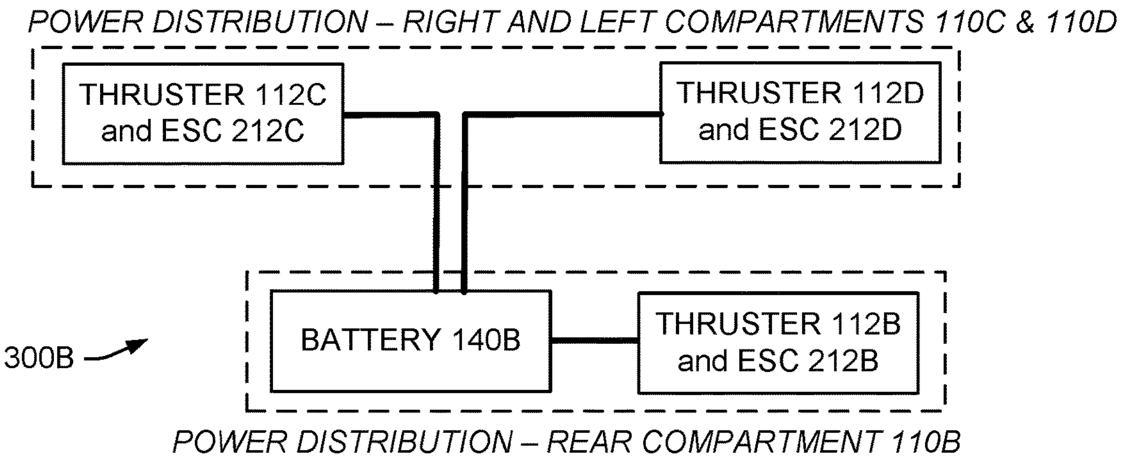

FIG. 4A
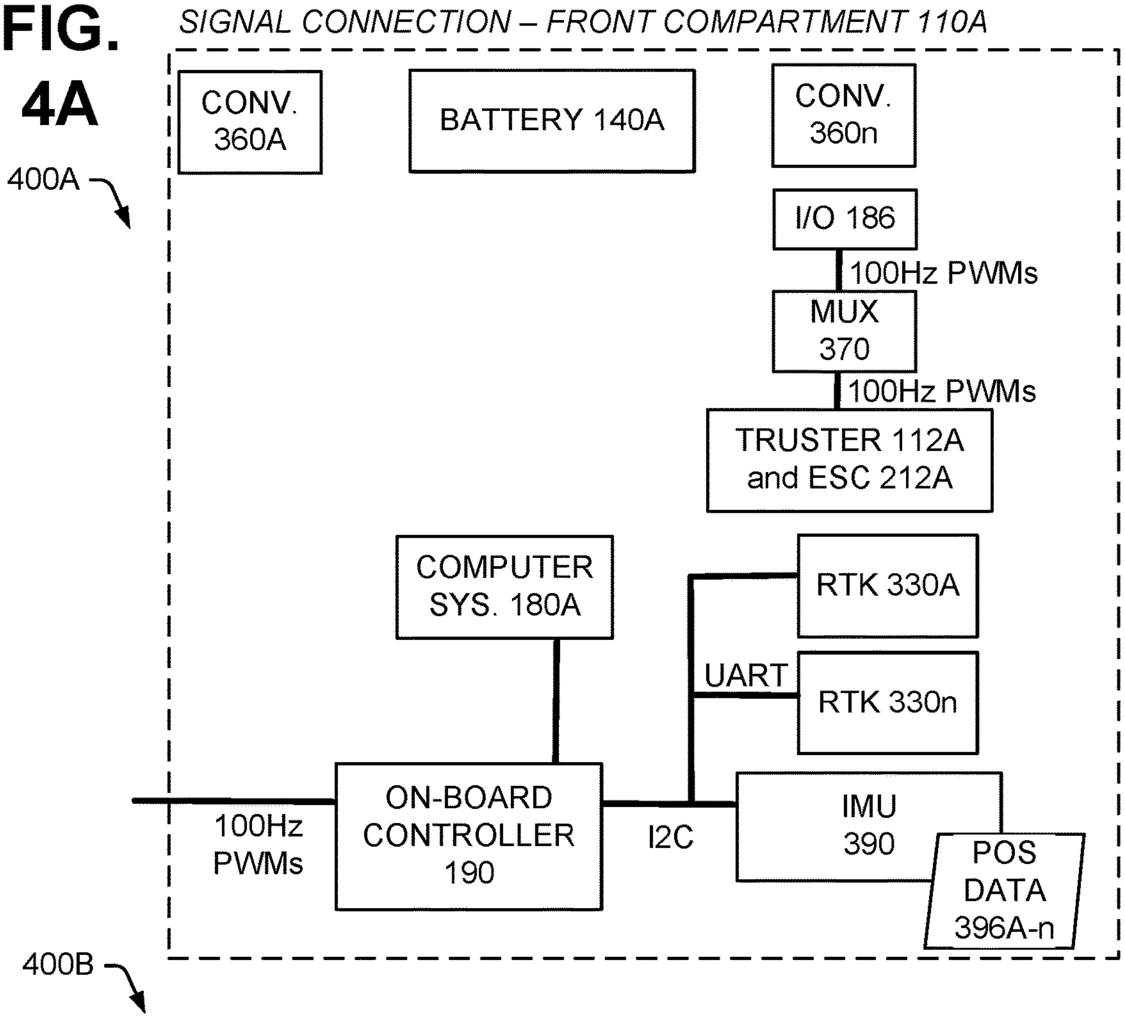
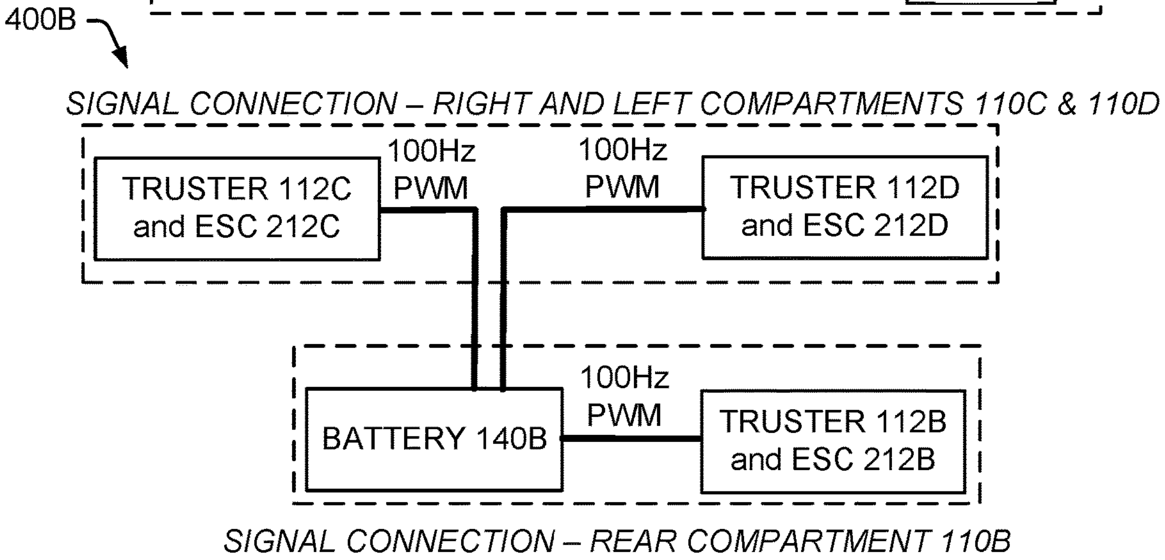
FIG. 4B
SYSTEM CONNECTION SYSTEM

RC RECEIVER + SIGNAL SWITCH DESIGN

OMNIDIRECTIONAL SURFACE VEHICLE

TECHNICAL FIELD

This application relates to a device for inspection of water-based structures, particularly aquaculture installations.

BACKGROUND

Aquaculture, a.k.a., fish farming, accounts for nearly half of the fish destined for human consumption. However, the risk of fish escaping an aquaculture facility, e.g., due to cage net failure, poses substantial economic and environmental challenges. Such cage net failures can be failure of the net structure, whereby the net now has a hole greater than as originally designed. Typically, the integrity of nets is inspected by human divers, however, such inspections can engender health and safety risks to the divers, as well as potential loss of fish stock.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, methods, apparatus and/or computer program products are presented that facilitate operation of an omnidirectional surface vehicle (OSV) to detect presence of an anomaly in a submerged structure such as an unwanted hole in a net.

The one or more embodiments described herein present an OSV comprising two or more buoyant compartments configured to support the OSV on a surface of a body of water. The OSV can further comprise a thruster configured to positionally navigate the OSV and a camera located onboard the OSV, wherein an orientation of the camera is adjustable.

In an embodiment, the two or more buoyant compartments can respectively comprise a hollow spherical configuration formed with two separable halves, and wherein one or more components are located within one or more respective compartments to enable transport of the one or more components onboard the OSV.

In a further embodiment, operation of the thruster can be configured to facilitate motion of the OSV at the surface of the body of water, wherein the thruster is connected to a ducted channel, and wherein operation of the thruster causes fluid to be drawn into the ducted channel or ejected from the ducted channel.

In an embodiment, the OSV can include an image processor configured to receive imaging data from the camera, process the imaging data, and further determine an integrity of a structure from the imaging data. The structure can be a net in an aquaculture facility.

In an embodiment, the camera further comprise a lens focuser configured to adjust focus of the camera as part of enabling the integrity of the structure to be determined.

In another embodiment, the OSV can further comprise a position manager configured to determine at least one of a position of the OSV or an alignment of the OSV, further generate and transmit first position data comprising the at least one of the position of the OSV or the alignment of the OSV. The image processor can be further configured to receive the first position data, and determine, based on the first position data, at least one of a location or a size of a fault in the integrity of the structure.

In another embodiment, the position manager can be further configured to: (a) receive second position data, wherein the second position data is received from a first device remotely located from the OSV or receive third position data, wherein the third position data is received from a second device located onboard the OSV, and (b) determine, based on at least one of the second position data or the third position data, the at least one of the position of the OSV or the alignment of the OSV.

In an embodiment, the OSV can comprise five buoyant compartments in an arrangement comprising a central buoyant compartment to which four buoyant compartments other than the central buoyant compartment are attached, wherein the four buoyant compartments are arranged in a diamond pattern around the central buoyant compartment, with the arrangement with respect to the four buoyant compartments comprising a front buoyant compartment, a rear buoyant compartment, a right buoyant compartment positioned between the front buoyant compartment and the rear buoyant compartment, and a left buoyant compartment located between the front buoyant compartment and the rear buoyant compartment, and wherein the right buoyant compartment is located opposite the left buoyant compartment. In an embodiment, the camera can be located at the front buoyant compartment.

In an embodiment, the thruster can be a first thruster, and the OSV can further comprise a second thruster configured to operate in conjunction with the first thruster to positionally navigate the OSV, wherein navigation of the OSV at the surface of the body of water is enabled to be omnidirectional.

In further embodiments, a computer-implemented method is provided, wherein the method comprises receiving, by a device comprising at least one processor, an image of a structure, wherein the image is received from a camera located on an omnidirectional surface vehicle (OSV) configured to operate at a surface of a fluid, further processing, by the device, the image, and further, based on a result of the processing, determining, by the device, an integrity of the structure. The structure can be a net located at an aquaculture facility and the net is located beneath the surface of the fluid. As previously mentioned, the OSV can comprise a set of buoyant compartments collectively combined to form a floating platform on which is located the camera and at least one thruster configured to position the OSV at the surface of the fluid.

In an embodiment, the computer-implemented method can further comprise: (a) determining, by the device, at least one of an alignment or a position of the OSV; (b) determining, by the device, based on the at least one of the alignment or the position of the OSV, a viewpoint of a camera located on the OSV; (c) determining, by the device, a focal point of the camera, wherein a feature of interest that is part of the structure is positioned at the focal point of the camera; and (d) based on at least one of the viewpoint of the camera or the focal point of the camera, determining, by the device, a location of the feature of interest relative to the camera.

In a further embodiment, the computer-implemented method determining, by the device, a size of the feature of interest, wherein the feature of interest is a first hole in the net, wherein the size of the feature of interest is determined based on a known size of a standard sized hole opening in a pattern of standard sized holes in the net.

Further embodiments can include a computer program product stored on a non-transitory computer-readable medium and comprising machine-executable instructions, wherein the computer-readable medium is located on an OSV, and wherein, in response to being executed, the machine-executable instructions cause the OSV to perform operations, comprising: generating one or more images of a net, wherein the net is located in an aquaculture facility and the one or more images are generated by a camera located inside a first buoyant compartment forming the OSV, further reviewing the one or more images to determine whether an anomaly is present in the net, and in response to determining that the anomaly is present, identifying a location of the anomaly based on at least one of a position of the OSV, an orientation of the OSV, a field of view of the camera, or a position of a lens in the camera, and further generating an image with the anomaly identified on the image in conjunction with the location of the anomaly.

In an embodiment, the first buoyant compartment can be attached to at least one other buoyant compartment included in a set of buoyant compartments, and wherein the set of buoyant compartments is arranged to form a floating platform configured to transport the camera.

In another embodiment, the OSV further comprises a first thruster located in a second buoyant compartment in the set of buoyant compartments and a second thruster located in a third buoyant compartment in the set of buoyant compartments, and wherein the first thruster and second thruster are configured to move the OSV across a surface of a body of water.

In a further embodiment, the operations further comprise receiving an OSV position instruction identifying a location of operation of the OSV, and controlling operation of the first thruster or the second thruster to control positioning of the OSV in accordance with the OSV position instruction.

DESCRIPTION OF THE DRAWINGS

One or more embodiments are described below in the Detailed Description section with reference to the following drawings:

FIGS. 1A and 1B present schematics of an OSV system, in accordance with one or more embodiments.

FIGS. 3A and 3B are schematics presenting example systems to further illustrate the respective components comprising the positioning system/power distribution of an OSV, in accordance with one or more embodiments.

FIGS. 4A and 4B are schematics presenting example signal systems utilized in an OSV, in accordance with one or more embodiments.

It is to be appreciated that the figures illustrated in the drawings are not to scale. Wherever possible, the same reference numbers have been used throughout the drawings and the accompanying written description to refer to the same or like parts.

DETAILED DESCRIPTION

Figure 1B:
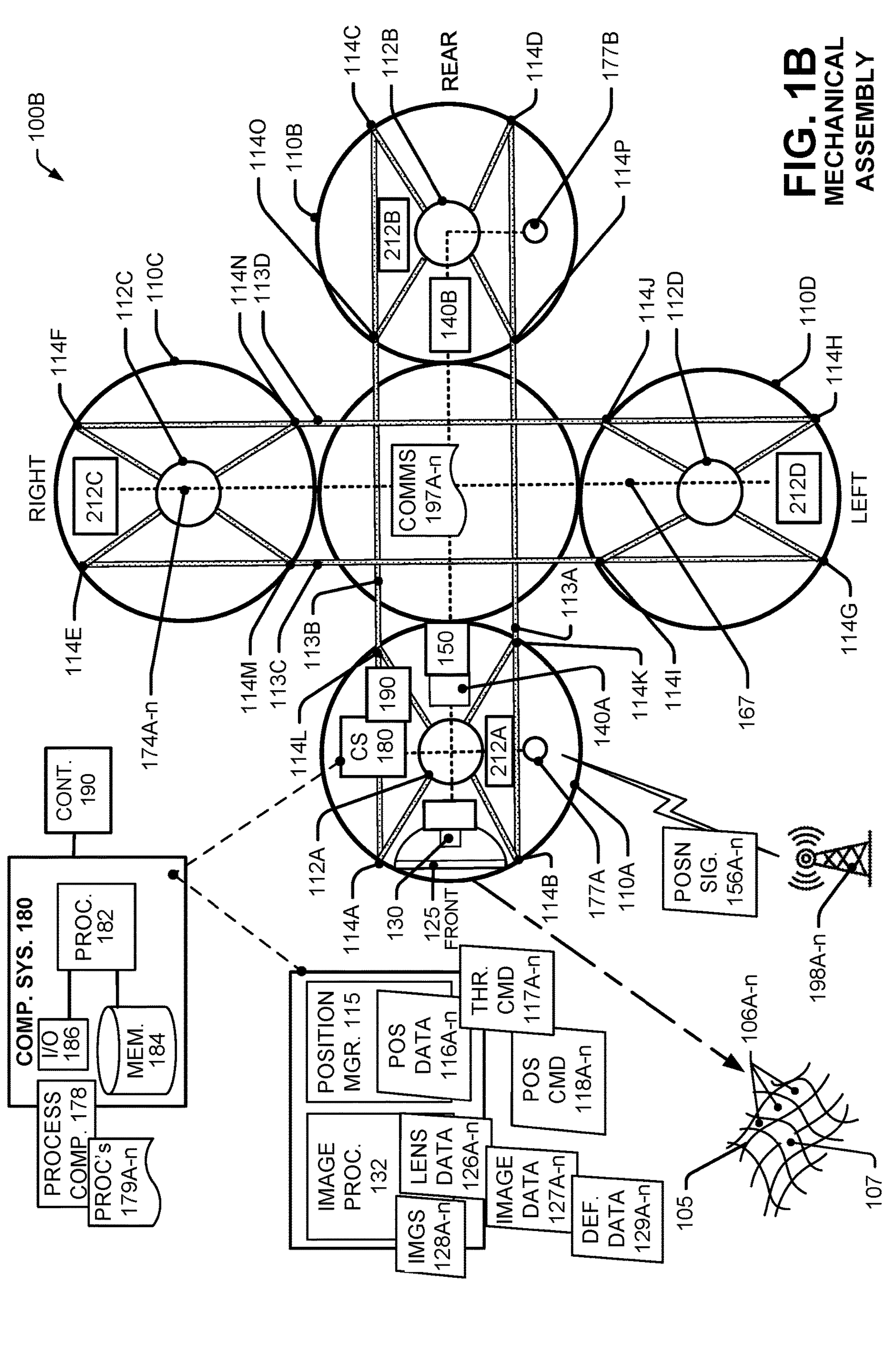

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting. As used herein, "data" can comprise metadata. Further, ranges A-n are utilized herein to indicate a respective plurality of devices, components, signals etc., where n is any positive integer.

1. Overview

As further described herein, an omnidirectional surface vehicle (OSV) is presented for marine/water-borne applications. The OSV is configured for inspection of water-based structures, e.g., an aquaculture fish cage/fish net inspection. It is to be appreciated that while the various embodiments presented herein are directed to inspection of aquaculture facilities, the various embodiments are equally applicable to inspection of any structure/infrastructure located on or in a body of water, such as a bridge support, a marine/water-borne vessel, an oil rig, a harbor jetty/wall, a pier, underwater pipe, underwater cable, environmental monitoring/mapping, bathymetry, tracking and position reporting of a diver(s), and suchlike. It is to be further appreciated that while the various embodiments presented herein regarding operation of the OSV are directed towards operation on and/or near to the surface of a body of water, the OSV can be implemented on any fluid amendable to the various embodiments presented herein regarding utilizing a camera to inspect a structure. It is to be further appreciated that while the various embodiments presented herein are directed towards utilizing a camera (e.g., using the visible light portion of the electromagnetic spectrum) to investigate a structure, any suitable device can be utilized such as a radar system, a laser-reflection system, and suchlike, wherein the suitable device can be utilized to generate images, signals, etc., enabling the integrity of the structure to be assessed.

Per the various embodiments, an OSV is presented having a multi-hull design for omnidirectional maneuverability in an aquaculture facility. In an embodiment, the respective components of the multi-hull design can be symmetrically positioned. The OSV can include an overdrive thruster configuration with ducted thrusters providing redundancy and reliability in complex fish farm environments. The OSV can be further equipped with a camera, wherein the camera can comprise a motorized position adjustment for inspection of a fish cage at various/different depths. Further, artificial intelligence (AI) and machine learning (ML) technologies and techniques can be utilized to identify integrity of a structure, e.g., a net, and potential damage thereto. For example, a neural network-based damage detection function can be configured to identify net damage, based on detection/identification of net holes that are irregularly shaped in comparison with expected hole shapes in the fabricated net structure. In an embodiment, a discrete hardware accelerator can be utilized to implement the various AI/ML technologies and techniques, enabling robust and accurate detection of net failure by performing multiple inspections for each failure/damage point. In another embodiment, the OSV can include an onboard, high-precision positioning device to determine location, direction, depth, inclination, orientation, and suchlike, of the OSV, from which the position of damage/non-damage of the fish cage/net can be further determined.

The various embodiments presented herein regarding an OSV provide benefits over manual cage net inspection by human divers. A complex fish farm environment poses risks to the life and health of divers. Many fish farms have low visibility and strong ocean currents underwater. There is also a risk of entanglement in the net when diving in aquaculture sites. In comparison, utilizing an OSV for cage net examination does not require diver intervention, with any human-related operations being performed remotely, e.g., from onshore, onboard a boat, etc. Further, deploying multiple OSVs at once can increase the rate of inspection. Furthermore, implementing one or more OSVs enables the inspection process to be fully automated, which can further reduce inspection cost, e.g., versus diver inspection. Also, OSVs provide benefit over remotely operated vehicles (ROVs) that may require qualified operators to perform tasks safely and efficiently, hence, examining large aquaculture sites with an ROV can be time-consuming/expensive to. Further ROVs are typically tethered to enable power supply and communication, whereby the tether cable can complicate/limit inspection in a fish farm environment. OSVs can provide benefit over an autonomous underwater vehicles (AUV) as localization, navigation, and communication are challenging for an AUV in aquaculture inspection applications. As a surface vehicle, an OSV has significantly fewer limitations in these aspects, with a wide range of localization and communication devices being integrated onboard an OSV. Further, with regard to a conventional surface vehicle, omnidirectional mobility is a highly favorable feature for aquaculture fish cage inspection. However, typically, a surface vehicle is designed for cruising and unable to move omnidirectionally.

2. Omnidirectional Surface Vehicle

Turning now to the drawings, FIGS. 1A and 1B present illustrations of an OSV system 100, in accordance with one or more embodiments. FIG. 1A is an orthographic top down view of OSV 100 and FIG. 1B is an isometric view of OSV 100.

As previously mentioned, an OSV 100 can be utilized to assess integrity of a structure, e.g., a net 105 at an aquaculture facility, whereby net 105 can comprise a pattern of holes 106A-*n* as well as a defect/unexpected hole 107, wherein, one or more dimensions of hole 107 are greater than a holes 106.

As shown, OSV 100 can comprise a set of buoyant, water-tight compartments 110A-*n* configured to support the various onboard components during operation of OSV 100. Per the configuration presented in FIGS. 1A and 1B, the compartments 110A-*n* comprise a front compartment 110A, a rear compartment 110B, a right compartment 110C, a left compartment 110D, and a central compartment 110E. It is to be appreciated that while FIGS. 1A and 1B illustrate an OSV 100 with five compartments 110A-E, any number of compartments can be utilized in any suitable configuration in accordance with the various embodiments herein. In an embodiment, the compartments 110A-E can be configured to form a symmetrical multi-hull design for omnidirectional maneuverability.

The compartments 110A-*n* can be of any suitable shape to facilitate movement/positioning of the OSV 100, operation of an onboard camera (e.g., camera 120, as further described), and/or onboard location of respective components/devices to facilitate operation of OSV 100 and communications with a remote system. In the example configuration presented in FIGS. 1A and 1B, one or more of the compartments 110A-*n* can respectively have a hollow sphere configuration/shape, whereby respective halves of a hollow sphere can be opened to facilitate location of equipment to be conveyed onboard the OSV 100 during operation of the OSV 100. While FIGS. 1A and 1B present compartments 110A-*n* as being hollow spheres, compartments 110A-*n* can be of any suitable shape, e.g., a hollow cuboid, a hollow polyhedron, a hollow ring/torus, hollow cylinder, hollow prism, any hollow shape, or any suitable combination of hollow spheres, hollow cuboids, hollow shapes, etc. Further, non-hollow forms can be incorporated into the OSV 100, such as forms made from polyethylene, polystyrene foam, vinyl covered forms, wood, plastic, balsa wood, low density material, etc. For example, rather than compartment 110E being a hollow sphere, compartment 110E can have a solid form such as a plastic (having a density less than fluid 210, per FIG. 2A) to which compartments 110A-D are attached. In another embodiment, the respective size (e.g., diameter) of the respective compartments 110A-*n* can be of different sizes, such as the outer four compartments 110A-D shown in FIGS. 1A-B can be of a larger diameter than the central compartment 110E, such that the outer four compartments 110A-D provide positional stability of OSV 100, while the central compartment 110E functions to connect the outer four compartments 110A-*n*.

Respective compartments 110A-*n* can be attached together by any suitable fastener or means for attaching the compartments 110A-*n*, e.g., coupled together with an attachment means (e.g., fastener 250, per FIG. 2B) enabling replacement of a compartment (e.g., compartment 110B leaks) with a watertight compartment (e.g., replacement of a leaking compartment 110B with a new watertight compartment 110*n*).

The configurable compartments 110A-*n* enable OSV 100 to be engineered to streamline inspection of aquaculture fish cages. Any suitable configuration of compartments 110A-*n* can be utilized, e.g., the example configuration of OSV 100 presented in FIGS. 1A and 1B has a symmetric quad-body design enabling omnidirectional mobility, damage resilience, and an augmented payload capacity (e.g., compared with a conventional system). The example symmetric multi-hull construction of compartments 110A-*n* enables OSV 100 to maintain lateral and longitudinal hydrodynamics, that can be identical in nature, facilitating case of control for omni-directional traversal/movement. The compartments 110A-*n* combine to form a payload platform, where devices (e.g., camera 120) that may contribute to hydrodynamic drag, are strategically positioned at/about the geometric center of the OSV 100, thereby preventing any unwanted steering torque during operation of OSV 100. Core electronic systems (computer system 180, controller 190, thrusters 112A-*n*) and battery packs (e.g., batteries 140A-*n*) can be located in oppositely positioned compartments (e.g., compartments 110A and 110B, compartments 110C and 110D, and the like), enabling the symmetric payload compartments 110A-*n* and central platform (e.g., formed by the compartments 110A-*n*) to be spacious, whereby such configuration(s) can simplify ballasting efforts. While OSV 100 navigates the intricate settings of an aquaculture facility (for example), collisions with structures, fish, etc., are virtually unavoidable. However, per the example four-edge compartment design of OSV 100 presented in FIGS. 1A-B, buoyancy of OSV 100 can be maintained even in the event of leakage in a compartment. Hence, while a compartment 110A may be leaking, compartments 110B-*n* remain intact to enable further operation of OSV 100 and/or location of OSV 100 to facilitate removal of OSV 100 from the aquaculture facility prior to the OSV 100 sinking.

As shown, and further described, OSV 100 can include an onboard computer system 180 and an onboard controller 190 (e.g., a microcontroller), whereby computer system 180 and controller 190 can operate in isolation and/or unison to facilitate operation of OSV 100 regarding any of position control/reporting, operation of thrusters 112A-*n*, operation of a camera 120, capture/analysis of images 128A-*n*, transmission/reception of communications 197A-*n*/signals 396A-*n* (as further described), etc. A variety of commands, data, etc., can be utilized during operation of OSV 100, such as position commands/instructions 118A-*n* to control location of OSV 100, thruster instructions 117A-*n* to control operation of thrusters 112A-*n* and location of OSV 100, position data 116A-*n* obtained/determined regarding location of OSV 100, lens position data 126A-*n* regarding location/focal point of lens 125, images 128A-*n* and imaging data 127A-*n* regarding location/direction/time/etc. of an image 128A or sequence of images 128A-*n* (e.g., combined to form a video stream), defect data 129A-*n* regarding location/depth/size of a defect 107 in net 105.

As mentioned, controller 190 can be a microcontroller (e.g., a small computer on a single integrated circuit), whereby utilizing a microcontroller 190 for one or more tasks for operation of OSV 100, versus computer system 180, can reduce electrical demand on batteries 140A-*n*, thereby enhancing the operational lifetime of OSV 100 between re-charging batteries 140A-*n*.

As shown, various components can be coupled to form a positioning system (per systems 300A-B, FIGS. 3A-B) to position OSV 100. The positioning system can comprise one or more one ducted thrusters 112A-*n* located in one or more of the compartments 110A-*n*. A thruster 112A-*n* can include any suitable motor, e.g., a brushless DC motor (per FIG. 5). A respective thruster 112A-*n* can be connected to a network of tunnels/ducts 113A-*n* and ports 114A-*n*, such that one or more thrusters 112A-*n* can operate in unison/or individually to steer/maneuver the OSV 100. Ports 114A-*n* can function as both a fluid inlet and/or a fluid outlet based on the respective operation of a thruster 112A-*n* during maneuvering of the OSV 100. In an embodiment, the respective thrusters 112A-*n* in conjunction with the respective ducting 113A-*n* can operate to generate forward thrust and/or reverse thrust, which, given configuration/location of the ducting 113A-*n*/ports 114A-*n*, enables motion of the OSV 100 in any desired direction, e.g., omnidirectional.

Figure 2A:
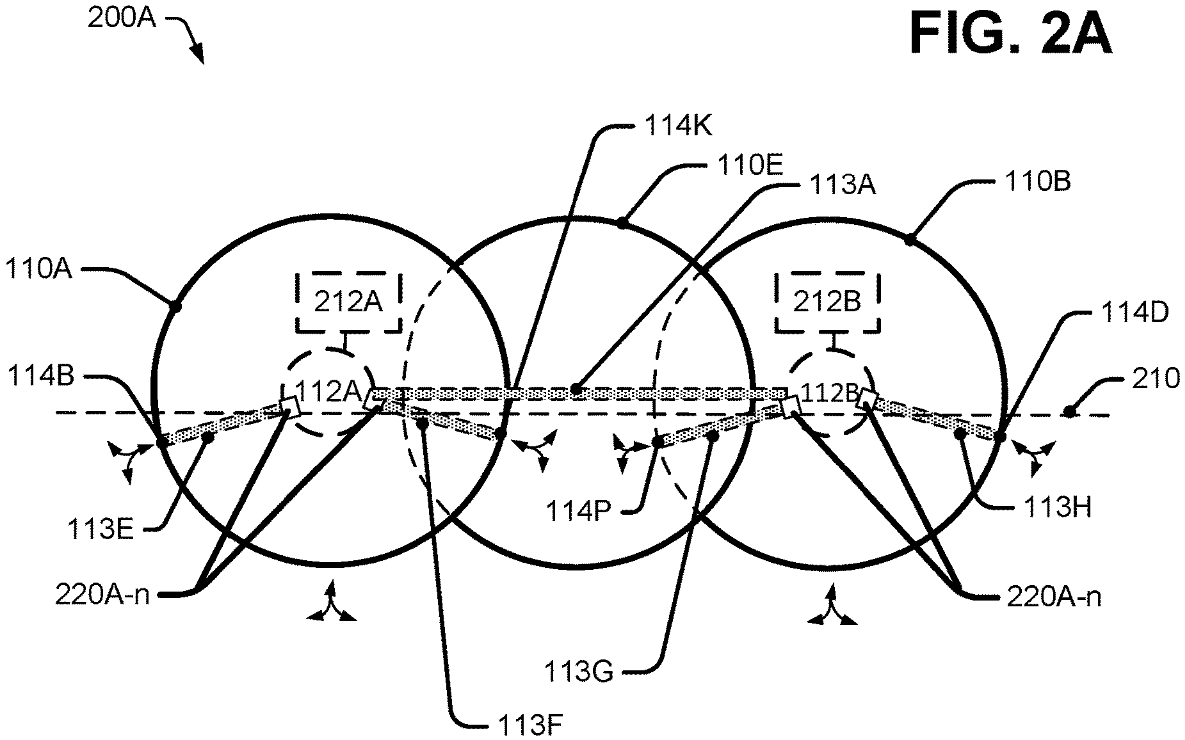
FIG. 2A presents a schematic illustrating a side view of an OSV, in accordance with one or more embodiments.

Turning momentarily to FIG. 2A, schematic 200A illustrates a side view of an OSV, in accordance with one or more embodiments. Schematic 200A illustrates OSV 100 with first/forward compartment 110A, second/rear compartment 110B, and central compartment 110E, wherein OSV 100 is located/floating on a surface of a fluid 210. In an example configuration, a first port 114A can be located on a lower surface of a compartment 110A, wherein first port 114A connects to a first thruster 112A via a first duct 113A, such that the first thruster 112A is configured to draw in fluid via the first port 114A and first duct 113A. First thruster 112A can be further connected to a second port 114B via second duct 113B, such that the first thruster 112A can be further configured to expel the fluid via the second port 114B and the second duct 113B. Thrusters 112A-*n* can respectively include various valves 220A-*n* having an adjustable position (e.g., open, closed, partially open, and the like) enabling fluid to be directed along respective ducts 113A-*n* and be expelled out of, or drawn in from, respective ports 114A-*n*. Accordingly, with respective thrusters 112A-*n* connected to a network of ducts 113A-*n*/ports 114A-*n* having configurable fluid pathways, operation of the thrusters 112A-*n*/valves 220A-*n* enables maneuvering/positioning of the OSV 100. Operation of the thrusters 112A-*n*/valves 220A-*n* can be controlled per thruster instructions 117A-*n* (e.g., generated by computer system 180/controller 190) in accordance with position commands/instructions 118A-*n* (e.g., generated by/received at computer system 180/controller 190).

The number, and operation, of the one or more thrusters 112A-*n* can surpass the required degree-of-freedoms (DOF) in directionality of the OSV 100. Further, by incorporating the respective thrusters 112A-*n* inside a respective compartment 110A-*n*, and the only connection between a thruster 112A-*n* and an external surface of the OSV 100 is the respective ducts 113A-*n* and ports 114A-*n*, unlike conventional systems (e.g., comprising external propellers), the OSV 100 is not prone to entanglement with an aquaculture structure (e.g., net 105). Further, by incorporating two or more thrusters 112A-*n* onboard an OSV 100, failure of one thruster (e.g., thruster 112A) can be accommodated by the one or more thrusters (e.g., thrusters 112B-*n*) that remain operational. In an embodiment, thrusters 112A-*n* can operate in conjunction with an electronic speed controller (ESC) 212A-*n*, wherein an ESC 212A-*n* can be configured to control operation of one or more thrusters 112A-*n* communicatively coupled, and controlled by, a respective ESC 212A-*n*. Operation of an ESC 212A-*n* can be performed by microcontroller 190 and/or computer system 180, e.g., per position instructions 118A-*n*, as shown in the example configuration 500 presented in FIG. 5.

The positioning system can further include a position manager 115 (a.k.a., a position component manager) configured to control operation of the thrusters 112A-*n* to enable positioning of the OSV 100. Position manager 115 can be further configured to generate position data 116A-*n*, whereby the position data 116A-*n* can be utilized to enable determination of defects 107 in net 105/holes 106A-*n*. For example, position data 116A-*n* can be utilized with lens position data 126A-*n* generated regarding position of camera 120/lens 125, wherein the respective position data 116A-*n* (e.g., direction, attitude, alignment, of OSV 100) and lens position data 126A-*n* can be utilized to identify location/depth of a point of interest (POI) regarding net 105/holes 106A-*n*. Position manager 115 can be executed by controller 190 and/or computer system 180.

As further shown, one or more cameras 120 can be located onboard the OSV 100. A camera 120 can comprise the respective components to be found in a camera, such as a lens 125, a lens positioning system 130 (e.g., a lens focuser), and an image processor 132 (a.k.a., image processing system), and the like. The lens positioning system 130 can be utilized to adjust a position of the lens 125 to facilitate image focusing for inspection of a net 105, e.g., over a range of depths of the water at the aquaculture facility. The lens positioning system 130 can be configured to generate/receive/process lens position data 126A-*n* regarding current/intended position of the lens 125. The image processor 132 can be utilized to receive imaging data 127A-*n* from the lens 125 (and associated image capture system, e.g., a charge-coupled device (CCD)) and process the imaging data 127A-*n*. As further described, the image processor 132 can operate in conjunction with various AI/ML processes 179A-*n* to enable detection of hole(s) 107A-*n* and determination of integrity of net 105. As further described, processes 179A-*n* can comprise one or more neural network-based damage detection functions to detect irregularly shaped/unexpected holes/openings 107A-*n* in the net 105. In an example scenario of implementation, position of one or more holes 106A-*n* in net 105 can be determined by measuring an attitude/alignment of OSV 100 based on positioning data 116A-*n* provided by position manager 115 in conjunction with imaging data 127A-*n* of camera 120/lens 125, whereby imaging data 127A-*n* can include line of sight information of the camera 120/lens 125 relative to net 105/defect 107.

Camera 120 can be any suitable camera, e.g., an underwater camera. In an embodiment, camera 120 can be located within a compartment (e.g., compartment 110A), whereby lens 125 is positionally moved by lens positioning system 130 within the compartment and captures imagery (e.g., of net 105) via a window (not shown) of transparent material incorporated in the external wall/surface of the compartment. In another embodiment, the camera 120 can be externally affixed to an external surface(s) of one or more of the compartments 110A-*n* by a moveable arm/support, such that camera 120 is effectively suspended/supported by the configuration of compartments 110A-*n*. Detection of a defect 107 in net 105 is further described with reference to FIG. 2B.

As shown, one or more localization beacons 177A-*n* (e.g., ultrasonic localization beacons) can be utilized to enable precise positional accuracy of OSV 100, e.g., via triangulation of signals 156A-*n* transmitted/received by the beacons 177A-*n* from one or more nodes 198A-*n* remotely positioned from the OSV 100, e.g., the nodes 198A-*n* are located around the aquaculture facility. Signals 156A-*n* can also comprise global positioning system (GPS) signals to further facilitate position determination of OSV 100.

As further shown, a communication system 150 can be further located onboard OSV 100, wherein the communication system 150 can comprise respective components to enable communications 197A-*n* to/from the OSV 100 to a remote system (e.g., an RC controller 160, remote computing system 165), etc. Communications 197A-*n* can include images 128A-*n*, position commands 118A-*n*, positioning data 116A-*n* of OSV 100, position data 126A-*n* of lens 125, location data 129A-*n* of the feature of interest 107, and the like, to enable remote review/operation, e.g., by a remote operator 175 (e.g., per FIG. 5), to further review the integrity of net 105/holes 106A-*n*, and further direct operation of the OSV 100 (e.g., adjust position of OSV 100 to review position of the damage/potential damage, adjust position of camera 120, move OSV 100 to a specific location, etc.), whereby communications 197A-*n* can further include positioning instructions 118A-*n*, etc., generated by the remote operator 175. In an embodiment, remote operator 175 can be a human entity, while in another embodiment, remote operator 175 can be a computer system utilizing AI/ML technologies (e.g., comparable to processes 179A-*n*) configured to investigate/analyze any current/potential damage to net 105.

One or more batteries 140A-*n* can be located onboard OSV 100 to provision power to the various devices/components located onboard OSV 100 (e.g., the thrusters 112A-*n*, the camera system 120A-*n*, computer system 180, controller 190, and the like). Batteries 140A-*n* can be respectively positioned onboard OSV 100 to enable balancing of OSV 100 (e.g., per FIGS. 3A-B and 4A-B).

As previously mentioned, one or more computer systems 180A-*n*/controllers 190A-*n* can be located onboard the OSV 100 to control operation of OSV 100. Computer system 180A-*n*/controllers 190A-*n* can be configured to operate one or more of the thrusters 112A-*n*/valves 220A-*n*, the camera lens positioning system 130, the image processor 132, etc. It is to be appreciated that functionality directed to a controller 190 can be performed by a computer system 180, and vice versa. Computer systems 180A-*n*/controllers 190A-*n* respective devices located onboard OSV 100 can be communicatively coupled via a communication network/bus 167.

The computer system 180A-*n*/controllers 190A-*n* can comprise a processor 182A-*n* and a memory 184A-*n*, wherein the processor 182A-*n* can execute the various computer-executable components, functions, operations, etc., presented herein, e.g., any of components onboard OSV 100, position manager 115, image processor 132, process component 178, and such. The memory 184 can be utilized to store the various computer-executable components, functions, code, etc., as well as information regarding any of position data 116A-*n* of OSV 100, position commands 118A-*n*, thruster commands 117A-*n*, images 128A-*n*, lens data 126A-*n*, image data 127A-*n*, defect data 129A-*n*, vectors $V_{1-n}$, similarity indexes $S_{1-n}$, processes 179A-*n* (as further described below), and suchlike.

As further shown, computer system 180 can include an input/output (I/O) component 186 (e.g., in communication system, 150), wherein the I/O component 186 can be a transceiver configured to enable transmission/receipt of information and data between any of the components located onboard OSV 100 and external to OSV 100. In an embodiment, I/O component 186 can be configured to transmit various communications 197A-*n* regarding operation of OSV 100, position commands 118A-*n*, images 128A-*n*, etc., and receive position signals 156A-*n*, etc.

Figure 2B:
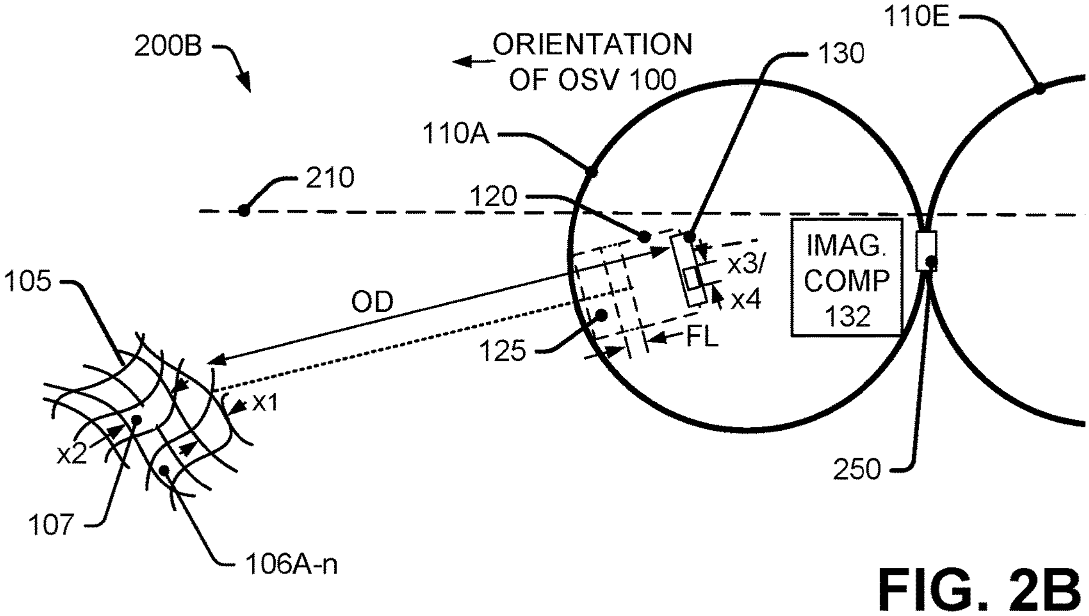
FIG. 2B presents a schematic illustrating determination of a presence of an anomaly, in accordance with one or more embodiments.

FIG. 2B presents a schematic 200B illustrating determination of an anomaly in an underwater structure, in accordance with one or more embodiments. As previously mentioned, images 128A-*n* captured at camera 120 can be utilized to determine a presence of an anomaly in a structure, e.g., hole 107 in net 105. In an example embodiment, with knowledge of a dimension, e.g., width x1, of an expected structure such as holes 106A-*n*, where the width x2 exceeds width x1, image processor 132 can be configured to determine a potential hole 107 exists in the net 105. Further, by knowing a width x3 of a known hole 106A-*n* versus the width x4 of the hole 106A-*n* in the camera 120 (e.g., on the CCD in the camera 120) in conjunction with the distance of the lens 125 relative to the camera 120 (e.g., the focal length (FL) of lens 125) it is possible to determine the object distance OD from the camera 120 to the potential hole 107. Hence, it is possible to determine both a direction of hole 107 from the OSV 100 and also a depth at which the potential hole 107 is located. The image processor 132 can be configured to supplement the image 128A of the hole 107 with positioning data 116A-*n*, lens data 126A-*n*, and suchlike, to enable the location of hole 107 to be readily determined, e.g., by current/subsequent review of images 128A-*n* (e.g., by remote entity 175).

In an embodiment, the image processor 132 can be further configured to determine any of a viewpoint/field of view/focal point of the camera 120/lens 125 (e.g., conveyed in lens data 126A-*n*) to enable location/size of the defect 107 in the net 105 to be determined. For example, image processor 132 can utilize the position data 116A-*n* of the OSV 100 (e.g., position, alignment, and the like), lens position data 126A-*n*, and the like, to determine the field of view of an image(s)/video 128A-*n* being captured/generated by the camera 120 and further to determine a focal point/FL of camera 120/lens 125 from which a determination can be made by the image processor 132 regarding location, depth, etc., of the feature of interest 107 in the net 105, relative to the camera 120/lens 125. In an embodiment, respective position information 116A-*n* regarding the position/direction of the OSV 100, the direction of the camera 120, direction/location of the feature of interest 107, and suchlike, can be incorporated into the image(s) 128A-*n* generated by the image processor 132. As further described, process component 178/processes 179A-*n* can be utilized by the image processor 132 to determine presence of defect 107, e.g., by comparing a size x2 of defect 107 with known dimensions/opening x1 of holes 106A-*n*, such that where an identified hole in net 105 has a dimension greater than known dimension of hole 106A, the identified hole can be marked (e.g., in an image 128A) as being a potential defect 107 for further investigation, where the potential defect 107 can be marked with position data 116A-*n*, lens position data 126A-*n*, image data 127A-*n*, etc.

FIGS. 3A and 3B are schematics presenting systems 300A and 300B to further illustrate the respective components comprising the positioning system/power distribution of an OSV, in accordance with one or more embodiments. Systems 300A and 300B present wiring diagrams illustrating example electrically coupled components/devices. As shown in FIGS. 3A and 3B, a first battery 140A can be utilized to provision power to the respective components in positioning system 300. Further, one or more real time kinematic (RTK) devices 330A-*n* (e.g., RTK offshore devices) can be utilized to accurately determine and/or control position of the OSV 100, as well as identify location of damage to net 105. The one or more RTK devices 330A-*n* (e.g., functioning as localization beacons 177A-*n*) can utilize RTK global positioning system (RTK GPS) positioning technology utilizing a combination of GPS signals in conjunction with position signals provided by a local base station (node 198A-*n*), whereby RTK GPS can provide position accuracy greater than that achievable with GPS alone, e.g., RTK GPS can provide positioning information accurate to within centimeters.

As further shown, position system 300 can further include one or more convertors 360A-*n* as required to facilitate provision of power to the various systems/components/devices included in OSV 100. For example, convertor 360A can be a 12V DC-DC convertor utilized to provision power to a computer system 180A, convertor 360*n* can be a 5V DC-DC convertor utilized to provision power to a communication system 150, signal multiplexor (MUX) 370, etc.

Other batteries 140B-*n* can be located onboard OSV 100 as required. For example, as shown in FIG. 3B, a second battery 140B can be utilized to provision power to thrusters 112B-*n* and ESCs 212B-*n*. In the example configuration, thruster 112B and ESC 212B are located in the rear compartment 110B, thruster 112C and ESC 212C located in the right compartment 110C, and thruster 112D and ESC 212D located in the left compartment 110D can be powered by battery 140B located in the rear compartment 110B. Batteries 140A-*n* can be distributed throughout OSV 100 as required to ensure operation of the respective components located onboard OSV 100, e.g., power distribution, energy allocation, energy efficiency, and the like, and also positional stability of the OSV 100 during operation.

As shown in FIG. 3A, an inertial measurement unit (IMU) 390 can be utilized to measure and report motion of OSV 100, e.g., acceleration, rotation, velocity, etc., in position data 116A-*n*. IMU 390 can be of any suitable configuration, for example, in an example implementation IMU 390 can be a 9 degrees of freedom inertial measurement unit (9 DOF IMU), and can include any of an accelerometer(s) measuring linear acceleration, a gyroscope(s) measuring angular rate, a magnetometer(s) measuring the strength and direction of the earth's magnetic fields, a pressure sensor(s) measuring external pressure, and the like. IMU 390 can be communicatively coupled to a controller 190/computer system 180 configured to receive signals 396A-*n* from the IMU 390 to facilitate positioning/operation of OSV 100 by the controller 190/computer 180.

FIGS. 4A and 4B are schematics presenting example signal systems 400A and 400B utilized in an OSV, in accordance with one or more embodiments. FIG. 4A illustrates example signal connection of devices/components which can be located in the front compartment 110A, FIG. 4B illustrates example signal connection of devices/components which can be located in any of the rear compartment 110B, the right compartment 110C, and/or the left compartment 110D. The presented values are for example purposes, and any applicable value can be utilized. During operation of OSV 100, pulse wave modulation (PWM) signaling can be utilized, e.g., 100 Hz PWM. Any suitable transmission rate of data across systems 400A and 400B can be utilized, e.g., 1M baud universal asynchronous receiver/transmitter (UART). Further, other data transmission technologies are applicable, such as if high-speed data transfer is a priority, then SPI having full-duplex communication and high data rate can be utilized, however is power consumption/simplicity is required then I2C half-duplex communication can be utilized.

Figure 5:
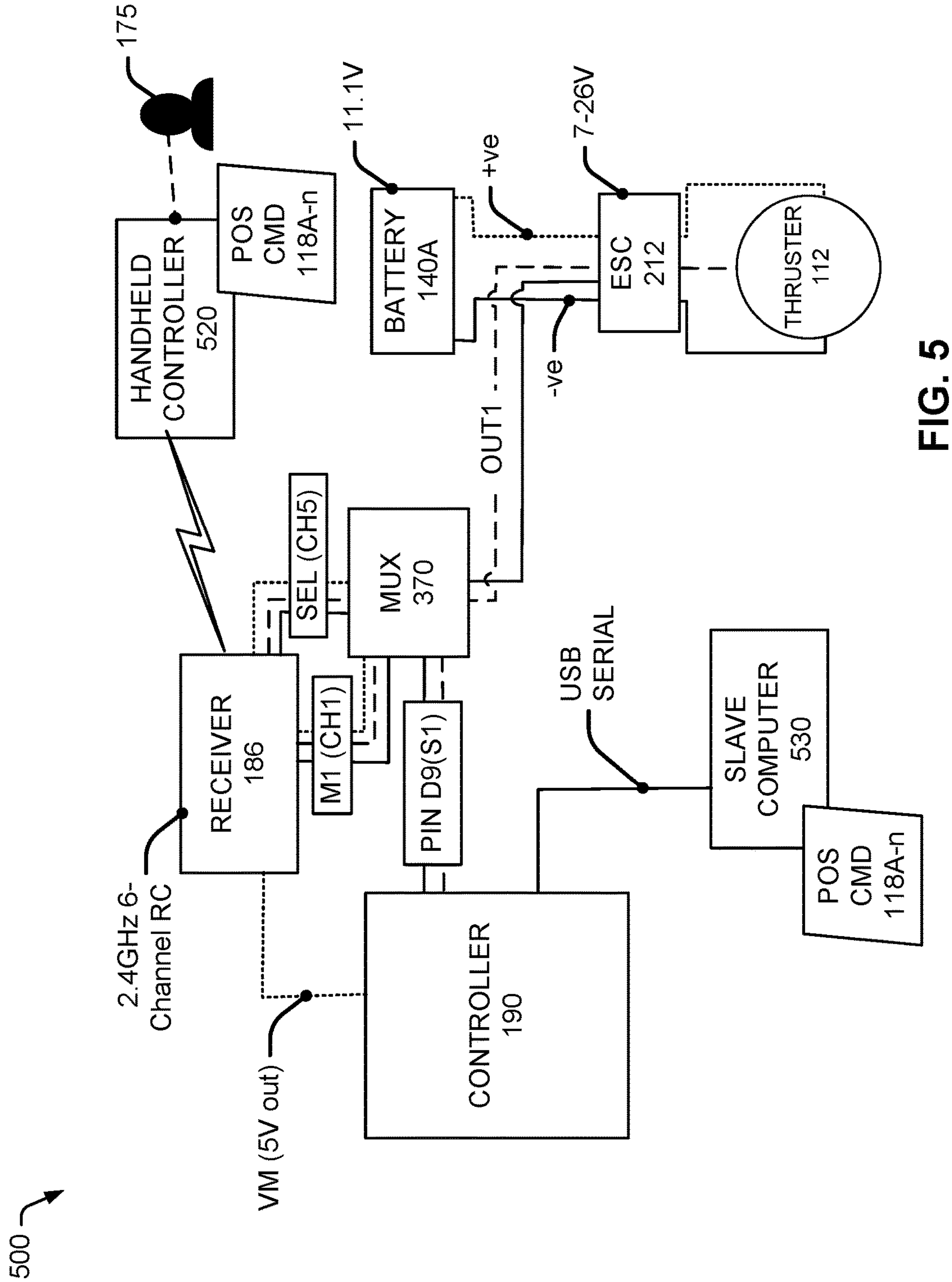
FIG. 5 presents a schematic of an example electrical system for switching control of operation of the OSV between a local controller and a remote controller, in accordance with one or more embodiments.

FIG. 5 presents a schematic of an example electrical system 500 for switching control of operation of the OSV between a local controller and a remote controller, in accordance with one or more embodiments. comprising a radio control (RC) controller and signal switching components for operation of a motor, in accordance with one or more embodiments. System 500 can include controller 190 configured to control operation of one or more thrusters 112A-*n*. In an example configuration, controller 190 can be an ARDUINO™ nano microcontroller. Controller 190 can receive multiple inputs, such as communications 197A-*n* between the controller 190 and a workstation 530, whereby the workstation 530 can be operating as a slave and running automatic control. Workstation 530 can be communicatively coupled to the controller 190 via any suitable means, e.g., tethered via a USB port.

Controller 190 can be further coupled to a receiver 186, wherein, controller 190 and receiver 186 can be coupled to a motor 112A-*n*/ESC 212A-*n* via a MUX 370 (e.g., a POLOLU 4-channel MUX). As further shown, system 500 can be powered by a battery 140A-*n*. System 500 can comprise other respective components/circuitry as shown in the example configuration, e.g., M1 (CH1), SEL (CH5), PIN D9(S1), and the like.

In an example operation, while positioning commands 118A-*n*, etc., can be generated by the onboard controller 190, receiver 186 can be configured to receive positioning signals 118A-*n* from the handheld controller 520, as well as the slave computer 530. Accordingly, while OSV 100 can operate autonomously based on position signals/instructions (e.g., in communications 197A-*n*) generated by the onboard controller 190, remote control/operation of the OSV 100 can be conducted by a remote device, e.g., handheld controller 520. Hence, per the example configuration presented in FIG. 5, MUX 370 can operate to switch control between the onboard controller 190 and the instructions 118A-*n* received from the remote controller (e.g., handheld controller 520, thereby ensuring safe and controlled operation of the OSV 100.

3. AI/ML Considerations

As mentioned, the various embodiments presented herein can utilize various AI/ML model/technology/technique/architecture (e.g., process component 178 implementing processes 179A-*n*). AI/ML technologies and techniques can be configured to determine information, make inferences, predictions, etc., regarding operation of OSV 100 and detection of holes 107 in net 105. Process component 178 and processes 179A-*n* can be implemented by any component included onboard OSV 100. For example, imaging processor 132 can be configured to utilize processes 179A-*n* to determine presence of an unwanted hole 107. Identification of hole 107 can be facilitated via an automatic classifier system and/or process.

Processes 179A-*n* can include AI, ML, and reasoning techniques/technologies that employ probabilistic and/or statistical-based analysis to prognose or infer an action that an entity desires to be automatically performed for carrying out various aspects thereof, e.g., determining presence of hole 107 rather than holes 106A-*n* forming net 105.

As used herein, the terms "predict", "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis to prognose or infer an action that a user desires to be automatically performed (e.g., identify hole 107, and suchlike).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via previously identified holes 107A-*n*, and suchlike). For example, SVM's are configured via a learning or training phase within a classifier constructor and feature selection module. Thus, the classifier (s) can be used to automatically learn and perform a number of functions, including but not limited to determining according to predetermined criteria, likely presence of a hole 107, and suchlike.

During training, prior decisions, prior observations, determinations, etc., can be applied to the processes 179A-*n*, enabling the processes 179A-*n* to be trained regarding likelihood of a hole 107 being present in a net 105. Accordingly, when new information is provided (e.g., processing of subsequent potential holes 107A-*n*, subsequent inspection of potential holes 107A-*n* (e.g., by a human diver), processes 179A-*n* can be retrained accordingly.

It is to be appreciated that the various processes 179A-*n* and operations presented herein are simply examples of respective AI and ML operations and techniques, and any suitable technology can be utilized in accordance with the various embodiments presented herein. In an example embodiment, process component 178/processes 179A-*n* can be applied to any of potential holes 107A-*n*. Wherein, process component 178/processes 179A-*n* can include a vector component to apply any suitable vectoring technology, such as, in a non-limiting list, bag of words (BOW) text vectors, Euclidean distance, cosine similarity, vector representation via term frequency-inverse document frequency (tf-idf) capturing term/token frequency (e.g., common terms across prior/current/future knowledge), neural network embedding layer vector representation of terms/categories (e.g., common terms having different tense), a transformer neural network, bidirectional and auto-regressive transformer (BART) model architecture, a bidirectional encoder representation from transformers (BERT) model, long short term memory network (LSTM) operation(s), a sentence state LSTM (S-LSTM), a deep learning algorithm, a sequential neural network, a sequential neural network that enables persistent information, a recurrent neural network (RNN), a convolutional neural network (CNN), a neural network, capsule network, a machine learning algorithm, a natural language processing (NLP) technique, sentiment analysis, bidirectional LSTM (BiLSTM), stacked BiLSTM, regular pattern expression matching, and suchlike. Language models, LSTMs, BARTs, etc., can be formed with a neural network that is highly complex, for example, comprising billions of weighted parameters.

During application of processes 179A-*n*, vector representations $V_{1-n}$ can be applied to a hole of known dimension (e.g., holes 106A-*n*) and a potential anomaly (e.g., hole 107A-*n*), such that vector similarity operations (e.g., vector clustering/distancing) can be applied to determine the likelihood of presence of a hole 107A-*n* in net 105. The degree of similarity/difference (e.g., via similarity indexes $S_{1-n}$) between respective information can be determined, for example, based on a threshold reflecting a proximity of a first vector generated from information pertaining to a hole 106A-*n* of known dimension versus a second vector generated from information pertaining to a potential hole 107A-*n*, enabling determination that the potential hole 107A-*n* is of concern and should be investigated, e.g., via vector quantization of a known hole 106A-*n* with the potential hole 107A-*n*.

It is to be appreciated that while any of image processor 132, position manager 115, process component 178, and suchlike, can function as separate components/implemented independently, the respective components and functionality can be combined into a single component, such as image processor 132 operating as a single, high-level component, with one or more of position manager 115, process component 178, and suchlike.

4. Example Methods of Operating an OSV

Figure 6:
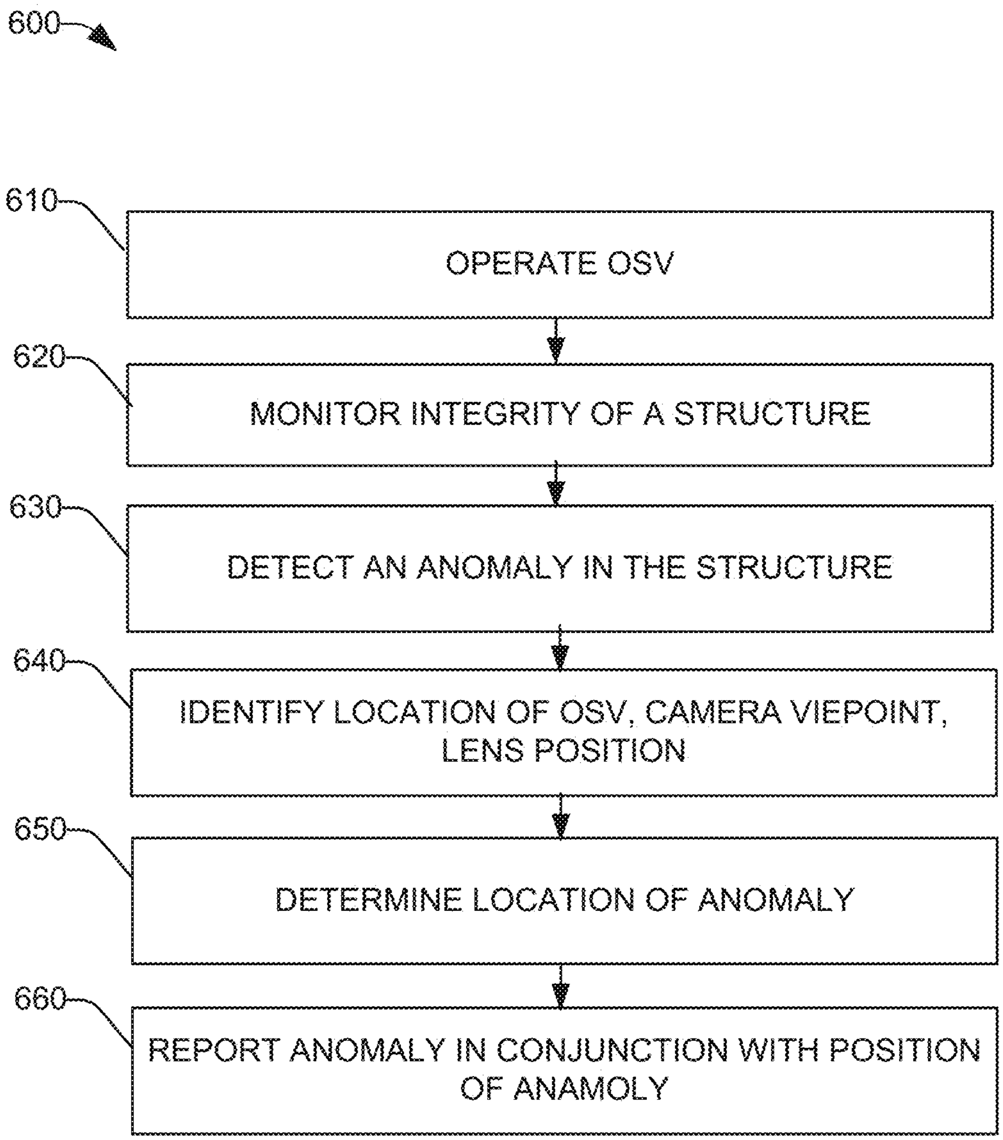
FIG. 6, per an example flowchart, presents a computer-implemented method for increasing in-plane image resolution, according to one or more embodiments.

FIG. 6 illustrates an example method 600 for utilizing an OSV to inspect an underwater structure, in accordance with one or more embodiments.

At 610, operation of an OSV (e.g., OSV 100) can be initiated (e.g., by position manager 115). As previously described, the OSV can comprise a platform of interconnected buoyant compartments (e.g., compartments 110A-*n*) on which is located a camera system (e.g., camera 120) configured to capture images of an underwater structure (e.g., net 105). The respective compartments can be configured to include a set of position thrusters (e.g., thrusters 112A-*n*) which are connected to a series of ducts and ports (e.g., ducts 113A-*n* and ports 114A-*n*) to enable navigation of the OSV by fluid intake/ejection. A position component (e.g., position manager 115) can be configured to control operation of the thrusters to facilitate positioning/location of the OSV, e.g., in accordance with respective position commands (e.g., position commands 118A-*n*). One or more microcontrollers (e.g., microcontroller 190) and computer systems (e.g., computer system 180) can be utilized to control operation of the OSV. Position of the OSV can be determined based on an onboard GPS system, as well as position data received at one or more localization beacons (e.g., localization beacons 177A-*n*) from nearby nodes (e.g., nodes 198A-*n*), and generated onboard the OSV (e.g., by IMU 390).

At 620, integrity of a structure (e.g., net 105) can be monitored (e.g., by image processor 132) by the OSV, e.g., per images (e.g., images 128A-*n*) captured by the onboard camera.

At 630, an anomaly in the structure can be detected (e.g., by image processor 132), whereby the anomaly can be a hole (e.g., hole 107) having at least one dimension different to an anticipated correlating/defined dimension (e.g., of holes 106A-*n*). As previously described (e.g., per FIG. 2A), one or more AI and ML processes (e.g., processes 179A-*n*) can be utilized to analyze images generated by the camera to determine location of the anomaly.

At 640, location of the OSV can be determined (e.g., by image processor 132 using position data 116A-*n*), as well as position/viewpoint of the camera, position of a camera lens (e.g., lens 125), and suchlike.

At 650, the location of the anomaly can be determined (e.g., by image processor 132) based on the determined position data of OSV, camera, camera lens, etc.

At 660, the anomaly can be reported (e.g., by image processor 132) whereby an image of the anomaly can be annotated with the determined location of the anomaly (e.g., per defect data 129A-*n*). Reporting of the anomaly enables, for example, the hole in the net to be identified and subsequently repaired.

Figure 7:
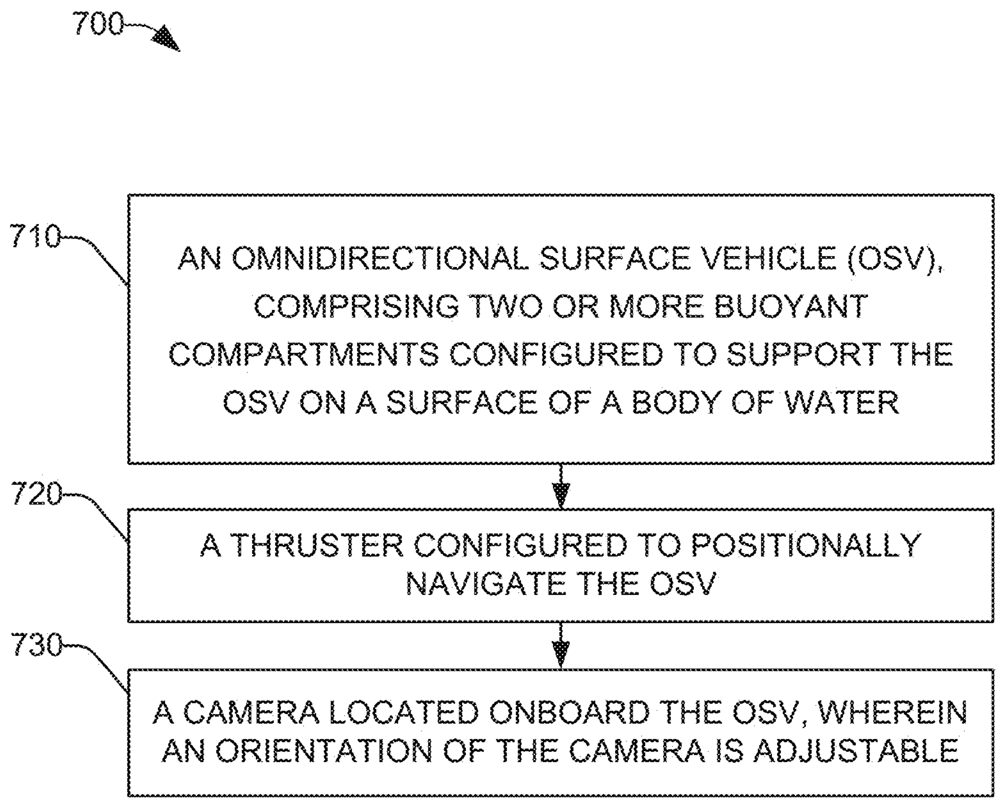
FIG. 7 presents an example computer-implemented method for utilizing an OSV to inspect a structure, in accordance with an embodiment.

FIG. 7, via flowchart 700, presents construction and operation of an OSV to inspect a structure, in accordance with an embodiment. At 710, an OSV (e.g., OSV 100) can be utilized, wherein the OSV comprises two or more buoyant compartments (compartments 110A-*n*) configured to support the OSV on a surface of a body of water (e.g., surface 210). At 720, the OSV can further comprise a thruster (e.g., thruster 112A) configured to positionally navigate the OSV. At 730, the OSV can further comprise a camera (e.g., camera 120) located onboard the OSV, wherein an orientation of the camera is adjustable.

Figure 8:
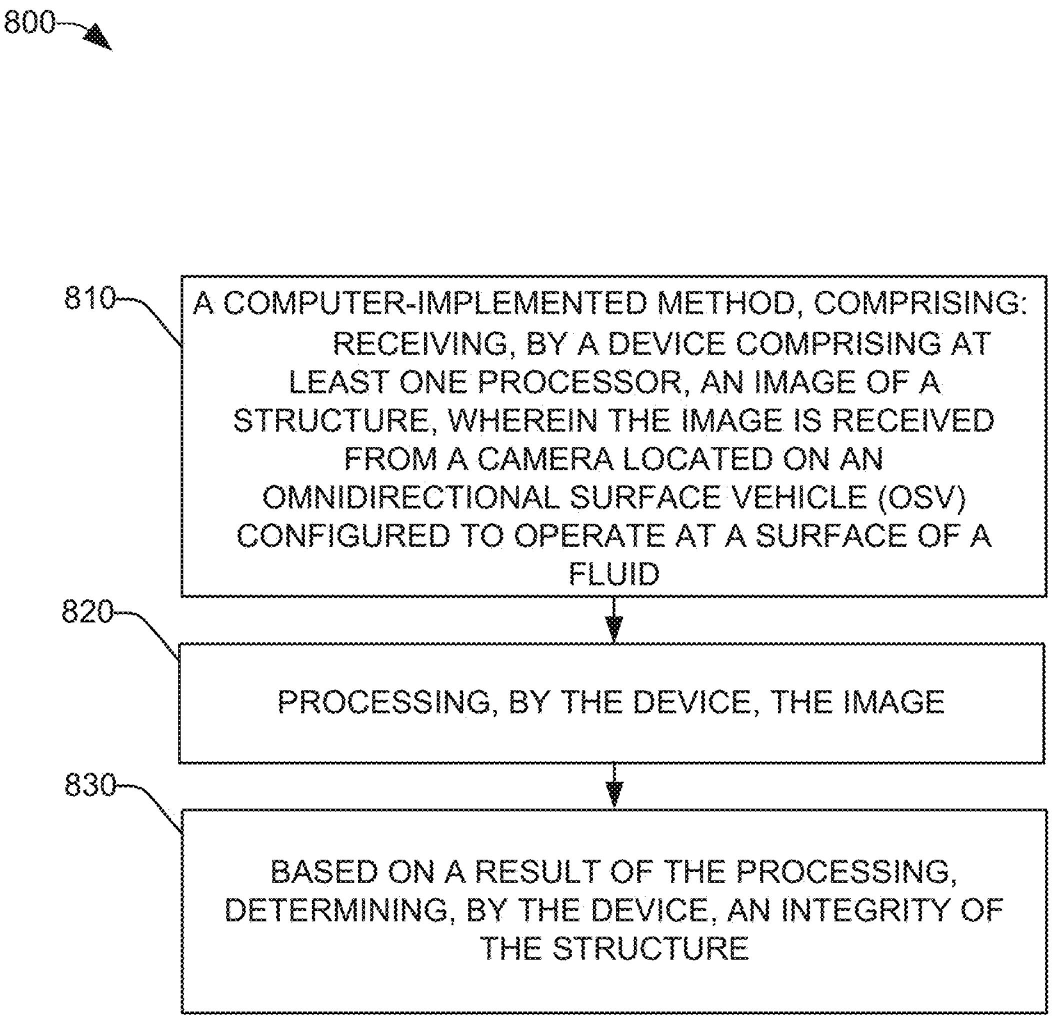
FIG. 8 presents an example computer-implemented method for utilizing an OSV to inspect a structure, in accordance with an embodiment.

FIG. 8, via flowchart 800, presents an example computer-implemented method for utilizing an OSV to inspect a structure, in accordance with an embodiment.

At 810, computer-implemented method 800 can comprise receiving, by a device comprising at least one processor (e.g., image processor), an image (e.g., image 128A-*n*) of a structure (e.g., net 105), wherein the image is received from a camera e.g., camera 120) located on an OSV (e.g., OSV 100) configured to operate at a surface of a fluid (e.g., surface 210). At 820, computer-implemented method 800 can further comprise processing, by the device, the image. At 830, computer-implemented method 800 can comprise, based on a result of the processing, determining, by the device, an integrity of the structure (e.g., presence of hole 107).

Figure 9:
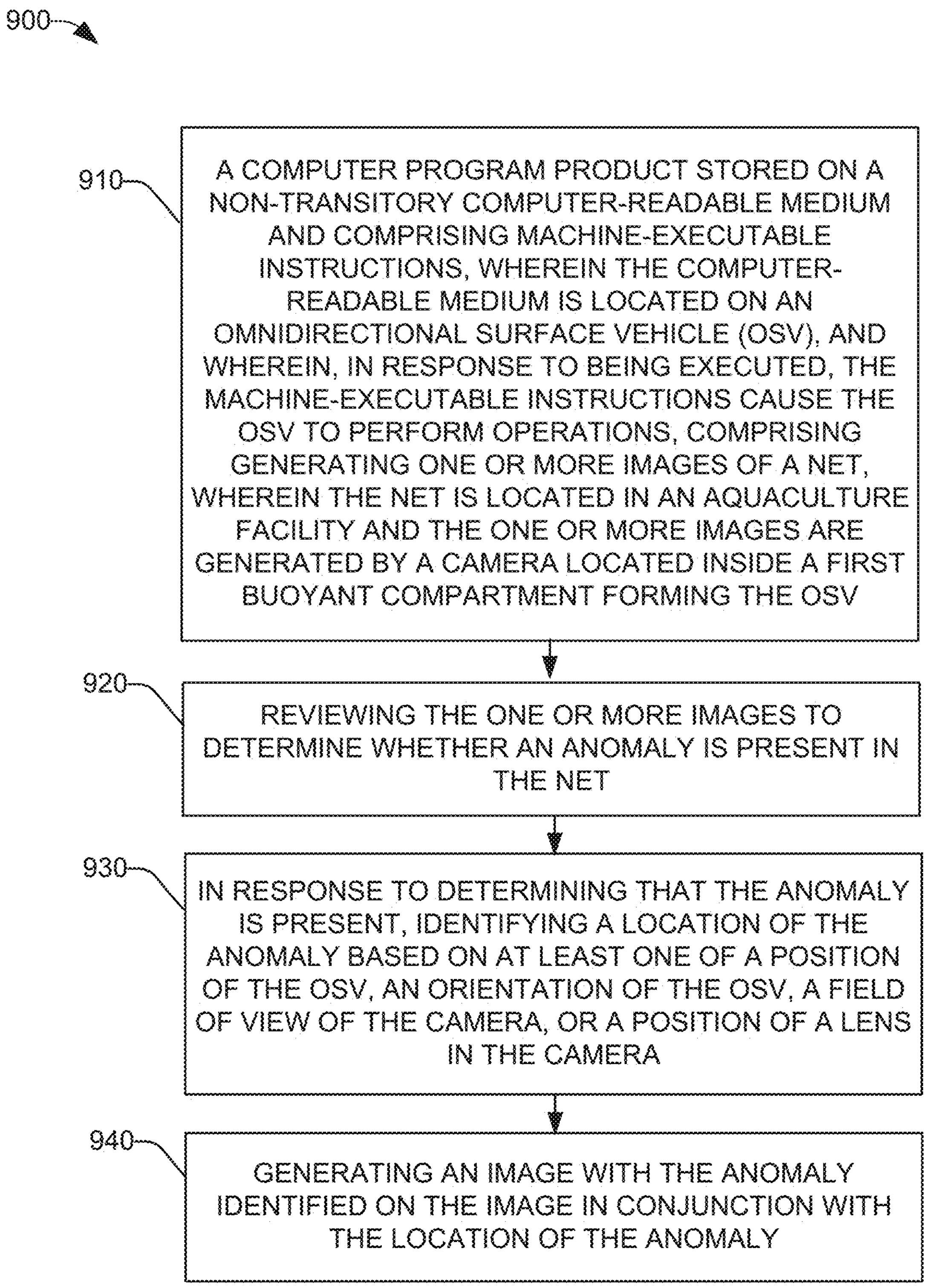
FIG. 9 presents an example computer-implemented method for utilizing an OSV to inspect a structure, in accordance with an embodiment.

FIG. 9, via flowchart 900, presents an example computer-implemented method for utilizing an OSV to inspect a structure, in accordance with an embodiment.

At 910, method 900 can comprise a computer program product stored on a non-transitory computer-readable medium and comprising machine-executable instructions, wherein the computer-readable medium is located on an OSV (e.g., OSV 100), and wherein, in response to being executed, the machine-executable instructions cause the OSV to perform operations, comprising generating one or more images (e.g., images 128A-*n*) of a net (e.g., net 105), wherein the net is located in an aquaculture facility and the one or more images are generated by a camera (e.g., camera 120) located inside a first buoyant compartment (e.g., compartment 110A) forming the OSV. At 920, method 900 can further comprise reviewing the one or more images to determine whether an anomaly (e.g., a hole 107) is present in the net. At 930, method 900 can further comprise, in response to determining that the anomaly is present, identifying a location of the anomaly based on at least one of a position of the OSV (e.g., in position data 116A-*n*), an orientation of the OSV, a field of view of the camera (e.g., in imaging data 127A-*n*), or a position of a lens in the camera (e.g., in lens position data 126A-*n*). At 940, method 900 can further comprise generating an image with the anomaly identified on the image in conjunction with the location of the anomaly (e.g., in defect data 129A-*n*).

5. Example Applications and Use

Figure 10:
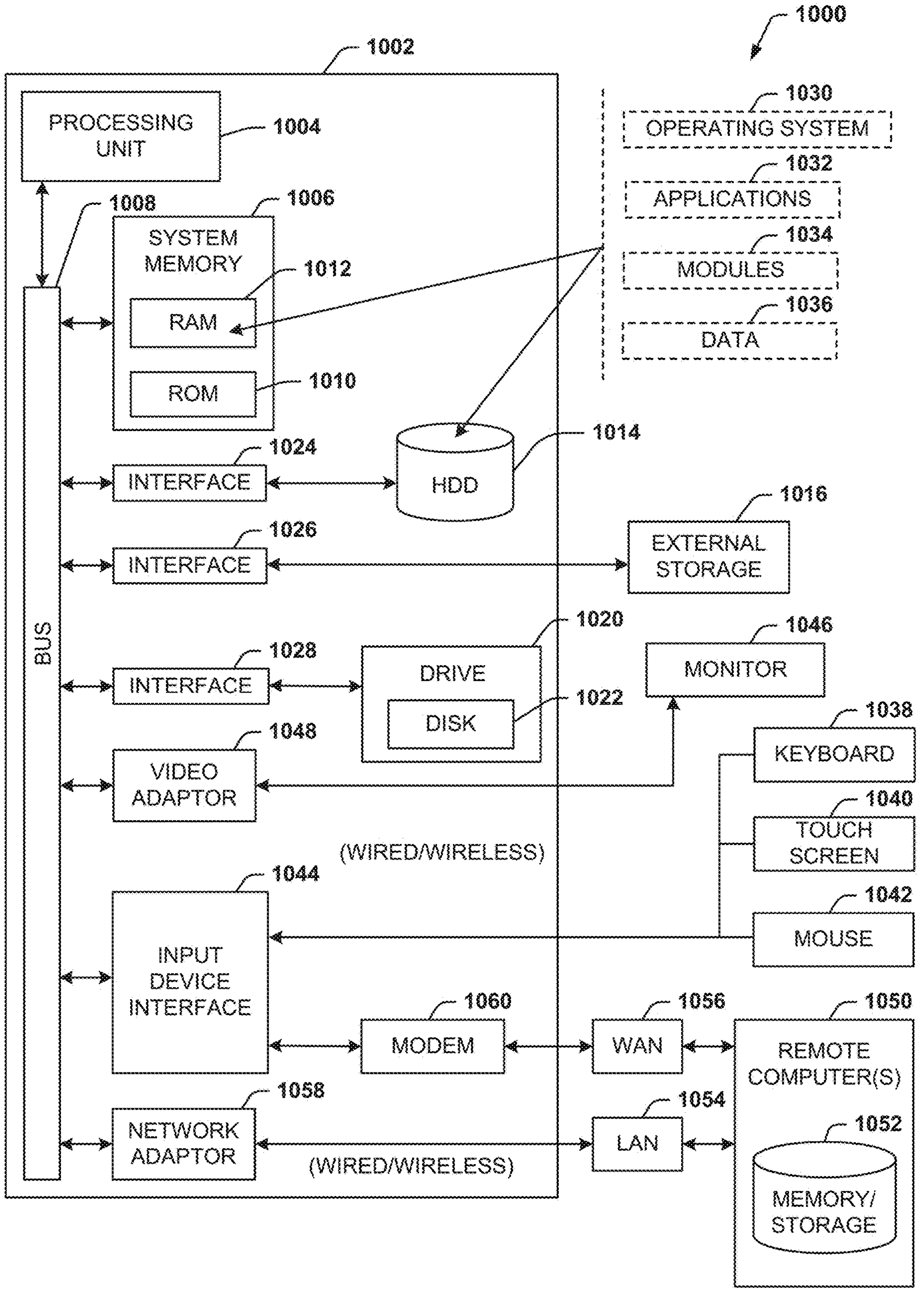
FIG. 10 presents an example environment for implementing various embodiments presented herein.
Figure 11:
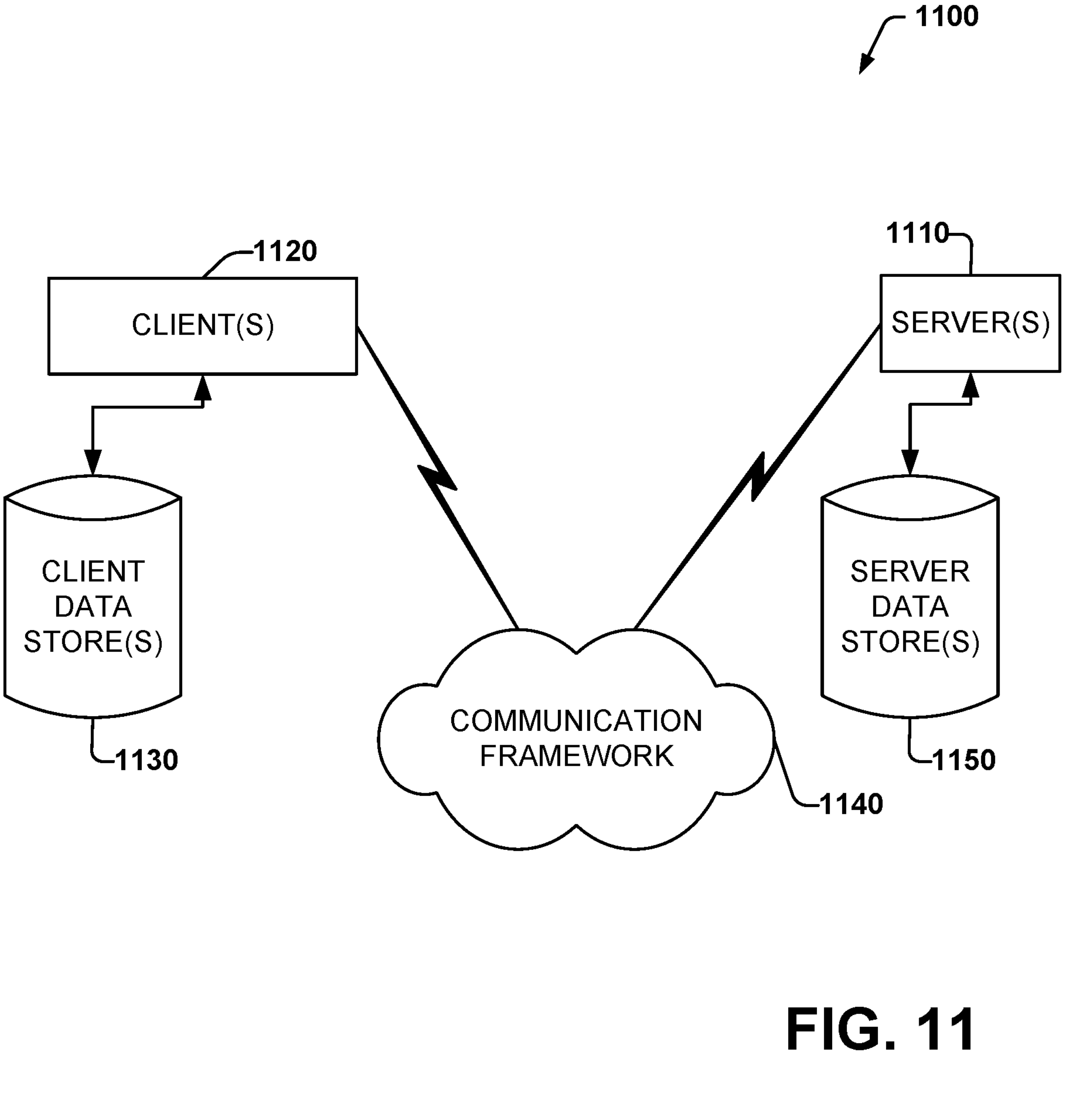
FIG. 11 illustrates an example wireless communication system, in accordance with one or more embodiments described herein.

Turning next to FIGS. 10 and 11, a detailed description is provided of additional context for the one or more embodiments described herein with FIGS. 1A-9.

In order to provide additional context for various embodiments described herein, FIG. 10 and the following discussion are intended to provide a brief, general description of a suitable computing environment 1000 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1022 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 11, an illustrative cloud computing environment 1100 is depicted. FIG. 11 is a schematic block diagram of a computing environment 1100 with which the disclosed subject matter can interact. The system 1100 comprises one or more remote component(s) 1110. The remote component (s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. An omnidirectional surface vehicle (OSV), comprising:

five or more buoyant compartments configured to support the OSV on a surface of a body of water;

a thruster configured to positionally navigate the OSV; and a camera located onboard the OSV, wherein an orientation of the camera is adjustable, and wherein the OSV comprises the five buoyant compartments in an arrangement comprising a central buoyant compartment to which four buoyant compartments other than the central buoyant compartment are attached, wherein the four buoyant compartments are arranged in a diamond pattern around the central buoyant compartment, with the arrangement with respect to the four buoyant compartments comprising a front buoyant compartment, a rear buoyant compartment, a right buoyant compartment positioned between the front buoyant compartment and the rear buoyant compartment, and a left buoyant compartment located between the front buoyant compartment and the rear buoyant compartment, and wherein the right buoyant compartment is located opposite the left buoyant compartment.

2. The OSV of claim 1, wherein the five or more buoyant compartments respectively comprise a hollow spherical configuration formed with two separable halves, and wherein one or more components are located within one or more respective ones of the buoyant compartments to enable transport of the one or more components onboard the OSV.

3. The OSV of claim 1, wherein operation of the thruster is configured to facilitate motion of the OSV at the surface of the body of water, wherein the thruster is connected to a ducted channel, and wherein operation of the thruster causes fluid to be drawn into the ducted channel or ejected from the ducted channel.

4. The OSV of claim 1, further comprising:

an image processor configured to:

receive imaging data from the camera;

process the imaging data; and determine an integrity of a structure from the imaging data.

5. The OSV of claim 4, wherein the structure is a net in an aquaculture facility.

6. The OSV of claim 4, wherein the camera further comprises a lens focuser configured to adjust focus of the camera as part of enabling the integrity of the structure to be determined.

7. The OSV of claim 4, further comprising:

a position manager configured to:

determine at least one of a position of the OSV or an alignment of the OSV;

generate and transmit first position data comprising the at least one of the position of the OSV or the alignment of the OSV, wherein the image processor is further configured to:

receive the first position data; and determine, based on the first position data, at least one of a location or a size of a fault in the integrity of the structure.

8. The OSV of claim 7, wherein the position manager is further configured to:

receive second position data, wherein the second position data is received from a first device remotely located from the OSV or receive third position data, wherein the third position data is received from a second device located onboard the OSV; and determine, based on at least one of the second position data or the third position data, the at least one of the position of the OSV or the alignment of the OSV.

9. The OSV of claim 1, wherein the camera is located at the front buoyant compartment.

10. The OSV of claim 1, wherein the thruster is a first thruster, and further comprising:

a second thruster configured to operate in conjunction with the first thruster to positionally navigate the OSV, wherein navigation of the OSV at the surface of the body of water is enabled to be omnidirectional.

11. A computer-implemented method, comprising:

receiving, by a device comprising at least one processor, an image of a structure, wherein the image is received from a camera located on an omnidirectional surface vehicle (OSV) configured to operate at a surface of a fluid;

processing, by the device, the image; and based on a result of the processing, determining, by the device, an integrity of the structure, wherein the OSV comprises a set of buoyant compartments collectively combined to form a floating platform on which is located the camera and at least one thruster configured to position the OSV at the surface of the fluid, wherein the set of buoyant compartments comprises five buoyant compartments comprising a central compartment to which four buoyant compartments of the five buoyant compartments other than the central compartment are attached, a front compartment attached to the central compartment, a rear compartment attached to the central compartment and positioned opposite to the front compartment, a right compartment attached to the central compartment between the front compartment and the rear compartment, and a left compartment attached to the central compartment between the front compartment and the rear compartment, wherein the left compartment is located opposite the right compartment, and wherein the four buoyant compartments are arranged in a diamond pattern around the central compartment.

12. The computer-implemented method of claim 11, wherein the structure comprises a net located at an aquaculture facility and the net is located beneath the surface of the fluid.

13. The computer-implemented method of claim 11, further comprising:

determining, by the device, at least one of an alignment or a position of the OSV;

determining, by the device, based on the at least one of the alignment or the position of the OSV, a viewpoint of the camera located on the OSV;

determining, by the device, a focal point of the camera, wherein a feature of interest that is part of the structure is positioned at the focal point of the camera; and based on at least one of the viewpoint of the camera or the focal point of the camera, determining, by the device, a location of the feature of interest relative to the camera.

14. The computer-implemented method of claim 12, further comprising:

determining, by the device, a size of the feature of interest, wherein the feature of interest is a first hole in the net, wherein the size of the feature of interest is determined based on a known size of a standard sized hole opening in a pattern of standard sized holes in the net.

15. A computer program product stored on a non-transitory computer-readable medium and comprising machine-executable instructions, wherein the computer-readable medium is located on an omnidirectional surface vehicle (OSV), and wherein, in response to being executed, the machine-executable instructions cause the OSV to perform operations, comprising:

generating one or more images of a net, wherein the net is located in an aquaculture facility and the one or more images are generated by a camera located inside a first buoyant compartment comprised by the OSV;

reviewing the one or more images to determine whether an anomaly is present in the net;

in response to determining that the anomaly is present, identifying a location of the anomaly based on at least one of a position of the OSV, an orientation of the OSV, a field of view of the camera, or a position of a lens in the camera; and generating an image with the anomaly identified on the image in conjunction with the location of the anomaly, wherein the OSV comprises five buoyant compartments in an arrangement comprising a central buoyant compartment to which four buoyant compartments other than the central buoyant compartment are attached, wherein the four buoyant compartments are arranged in a quadrilateral pattern around the central buoyant compartment, with the arrangement with respect to the four buoyant compartments comprising a front buoyant compartment, a rear buoyant compartment, a right buoyant compartment positioned between the front buoyant compartment and the rear buoyant compartment, and a left buoyant compartment located between the front buoyant compartment and the rear buoyant compartment, and wherein the right buoyant compartment is located opposite the left buoyant compartment.

16. The computer program product of claim 15, wherein the four buoyant compartments are arranged around the central compartment in a diamond pattern to form a floating platform configured to transport the camera.

17. The computer program product of claim 15, wherein the OSV further comprises a first thruster located in a second buoyant compartment, of the five buoyant compartments, and a second thruster located in a third buoyant compartment, of the five buoyant compartments, and wherein the first thruster and second thruster are configured to move the OSV across a surface of a body of water.

18. The computer program product of claim 17, wherein the operations further comprise:

receiving an OSV position instruction identifying a location of operation of the OSV; and controlling operation of the first thruster or the second thruster to control positioning of the OSV in accordance with the OSV position instruction.

19. The computer-implemented method of claim 11, wherein the camera is located at the front buoyant compartment.

20. The computer program product of claim 15, wherein the camera is located at the front buoyant compartment.

* * * * *